United States Patent [19]
Fujisawa et al.

[11] Patent Number: 5,342,698
[45] Date of Patent: Aug. 30, 1994

[54] SLIDE BEARING

[75] Inventors: Yoshikazu Fujisawa; Makoto Tsuji; Takeshi Narishge; Takahiro Gunji; Kazuhisa Okamoto, all of Saitama

[73] Assignee: Honda Giken Kogyo Kabushiki Kaisha, Tokyo, Japan

[21] Appl. No.: 897,379

[22] Filed: Jun. 11, 1992

[30] Foreign Application Priority Data

| Jun. 11, 1991 | [JP] | Japan | 3-165194 |
| Jul. 12, 1991 | [JP] | Japan | 3-197434 |
| Jul. 12, 1991 | [JP] | Japan | 3-197435 |
| Jul. 18, 1991 | [JP] | Japan | 3-202189 |
| Jul. 18, 1991 | [JP] | Japan | 3-202198 |

[51] Int. Cl.⁵ ............................................ F16C 33/12
[52] U.S. Cl. .................................... 428/612; 428/687; 428/935; 384/912
[58] Field of Search ............... 428/643, 644, 645, 687, 428/935, 612; 384/912, 913

[56] References Cited

U.S. PATENT DOCUMENTS

| 2,586,099 | 2/1952 | Schultz | 426/645 |
| 4,470,184 | 9/1984 | Fukuoka et al. | 384/913 |
| 4,937,149 | 6/1990 | Mori | 428/645 |
| 5,045,405 | 9/1991 | Koroschetz et al. | 428/612 |

FOREIGN PATENT DOCUMENTS

| 750557 | 6/1956 | United Kingdom . | |
| 1295997 | 11/1972 | United Kingdom . | |
| 2084191A | 4/1982 | United Kingdom | 205/253 |
| 2117403 | 10/1983 | United Kingdom . | |
| 2240343 | 7/1991 | United Kingdom . | |
| 2256235 | 12/1992 | United Kingdom . | |

OTHER PUBLICATIONS

G. Roventi et al., "Electrodeposition of Lead Alloys From Fluoborate Baths", Journal of Applied Electro Chemistry 14 (1984) pp. 505–510.

Primary Examiner—John Zimmerman
Attorney, Agent, or Firm—Lyon & Lyon

[57] ABSTRACT

A slide member includes a surface layer having a slide surface for a mating member. The surface layer is formed of metal crystals belonging to a cubic system with a plane of (h00) by Miller indices directed so as to form the slide surface. The percent area A of the (h00) plane in the slide surface is set in a range of $A \geq 50\%$.

11 Claims, 26 Drawing Sheets

⊢⊣ 1μm

⊢⊣ 5μm

1μm

1μm

1μm

⊢⎯⎯⏋10μm

⊢⎯⎯⏋1μm

SLIDE BEARING

BACKGROUND OF THE INVENTION

1. Field of the Invention

This invention relates to a slide member, and more particularly, to a slide member including a surface layer having a slide surface for a mating member.

2. Description of the Prior Art

There are conventionally known slide bearings as a slide member of such type, which are applied to engine parts, e.g., a cam shaft including a surface layer comprised of a metal plated layer provided around an outer peripheral surface of a journal portion of a base member for the purpose of improving the seizure and wear resistances, and a journal portion of a crankshaft, an enlarged end of a connecting rod, or the like, having a similar surface layer.

Under existing circumstances where there is a tendency of increasing speed and output of an engine, prior art slide bearings suffer from a problem that they exhibit an insufficient oil retention property and poor seizure and wear resistances at the surface layer thereof due to an inferior initial conformability. Also in the aspect of adhesion of the surface layer to the base member, there is room for improvement.

SUMMARY OF THE INVENTION

It is an object of the present invention to provide a slide member of the type described above, in which a sufficient oil retention property is provided to a surface layer and the initial conformability of the surface layer can be improved by specifying the crystal structure of the surface layer, thereby improving the seizure and wear resistance of the surface layer.

It is another object to the present invention to provide a slide member of the type described above, which is designed to have a surface layer with an improved peel strength.

To achieve the above objects, according to the present invention, there is provided a slide member comprising a surface layer having a slide surface for a mating member, wherein the surface layer has a crystalline structure belonging to a cubic system with a h00 plane by Miller indices thereof being directed so as to form the slide surface, and a percent area A of the (h00) plane in the slide surface is set in a range of $A \geq 50\%$.

If the metal crystals of the cubic system are oriented in such a manner that the (h00) plane appears in the slide surface, the metal crystals thus oriented are columnar in shape and terminate in a tip end that is a quadrangular pyramid-shaped crystal which in the aggregate form the slide surface.

If the percent area A of the (h00) plane and thus of the quadrangular pyramid-shaped crystals in the slide surface is set at a level equal to or more than 50% ($A \geq 50\%$), apexes of the quadrangular pyramid-shaped crystals can be preferentially worn in use to provide an improved initial conformability of the surface layer, and the surface area of the slide surface can be increased by the quadrangular pyramid-shaped crystals, so that the surface layer has a sufficient oil retention property. This increases the seizure resistance of the surface layer. However, if the percent area A is less than 50% ($A \leq 50\%$), the effects as described above cannot be obtained, resulting in a reduced seizure resistance of the surface layer.

Because the metal crystals belong to the cubic system and due to the orientation of the (h00) plane, an increased atomic density can be obtained in the direction of orientation, so that increased hardness and oil retention can be provided to the surface layer, leading to an increased wear resistance of the surface layer.

In addition, according to the present invention, there is provided a slide member comprising a surface layer having a slide surface for a mating member, wherein the surface layer is formed of an aggregate of crystals of a Pb alloy containing at most 17% by weight of Sn, and under application of X-ray diffractometry to the surface layer, if an integrated strength of first oriented crystals with a plane of (h00) by Miller indices thereof being directed toward the side surface is represented by I(a); and an integrated strength of second oriented crystals with planes of (111) and (222) by Miller indices thereof being directed toward the slide surface is represented by I(b); the following relationship is established:

$$0.5 \leq I(a)/\Sigma I(ab) \leq 1.0$$

wherein $\Sigma I(ab) = I(a) + I(b)$, and $I(b) = 0$ is included.

The first oriented crystals with the (h00) plane directed toward the slide surface are columnar crystals and their tip ends are formed as quadrangular pyramid-shaped crystals, and therefore, the surface layer has an improved seizure resistance similar to that described above.

Further, according to the present invention, there is provided a slide member in which a void is formed between adjacent columnar crystals forming the surface layer and is open to the slide surface to serve as an oil reservoir for the slide surface.

With such configuration, the surface layer has an excellent lubricating property, leading to a further enhanced seizure resistance of the surface layer.

Yet further, according to the present invention, there is provided a slide member comprising a base member, and a surface layer of an alloy formed on the base member, the surface layer having a slide surface for a mating member, wherein the surface layer is comprised of a base layer precipitated on the base member, and a slide surface-forming layer precipitated on the base layer and made of the same material as the base layer, the base layer including a dense aggregate of granular crystals, the slide surface-forming layer including as metal crystals at least one group of: a plurality of quadrangular pyramid-shaped crystals; and a plurality of truncated-quadrangular pyramid-shaped crystals forming the slide surface.

The aggregate of the granular crystals forming the base layer is dense and as a result, the base layer is firmly adhered to the base member. On the other hand, the slide surface-forming layer has a good adhesion to the base layer, because it is made of the same material as the base layer. This makes it possible to provide an increased peel strength of the surface layer with respect to the base member. The slide surface-forming layer has an improved seizure resistance similar to that described above, because it includes the quadrangular pyramid-shaped crystals and/or the like.

Yet further, according to the present invention, there is provided a slide member comprising a base member, and a surface layer of an alloy formed on the base member, the surface layer having a slide surface for a mating member, wherein the surface layer is comprised of a primary layer precipitated and formed on the base member, and a secondary layer precipitated on the primary layer, the primary layer including as metal crystals a plurality of columnar crystals extending in proximity to one another from the base member side, and the secondary layer including an aggregate of granular crystals having a hardness lower than that in the primary layer.

With the above configuration, the initial conformability is improved due to the low hardness of the secondary layer, thereby ensuring that the surface pressure when seizure is generated at the initial stage of sliding movement can be increased. On the other hand, after the initial stage of sliding movement, i.e., after wearing of the secondary layer, the wear of the primary layer is substantially suppressed, because the primary layer has an increased hardness due to the orientation of the (h00) plane.

The above and other objects, features and advantages of the invention will become apparent from a consideration of the following description of the preferred embodiments, taken in conjunction with the accompanying drawings.

BRIEF DESCRIPTION OF THE DRAWINGS

FIG. 6A is a photomicrograph showing a Ni crystal structure in a slide surface;

DESCRIPTION OF THE PREFERRED EMBODIMENTS

FIGS. 1 to 11 show a first embodiment of the present invention.

Figure 1:
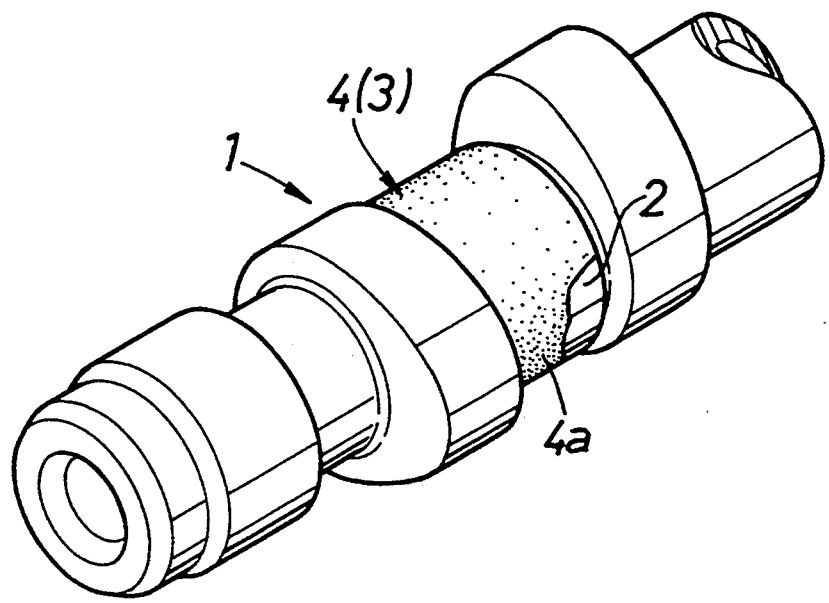
FIG. 1 is a perspective view of a cam shaft.
Figure 2:
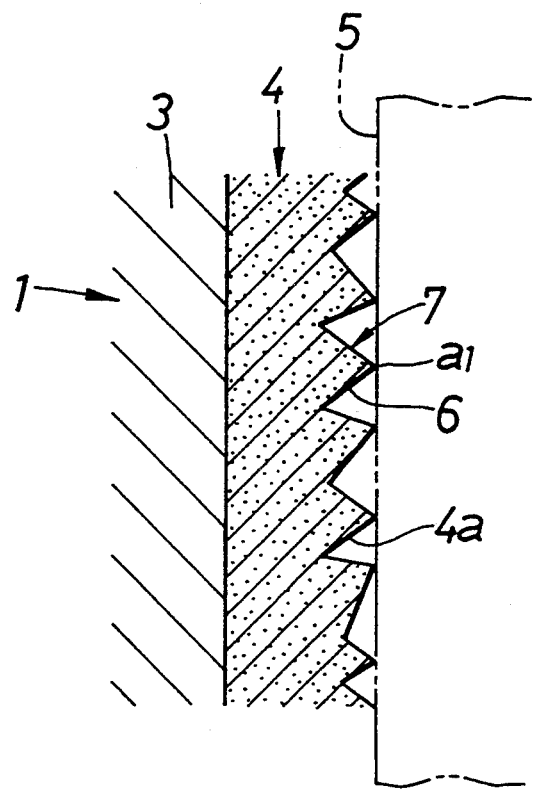
FIG. 2 is a sectional view illustrating a relation between a journal portion of the cam shaft and a slide bearing.

Referring to FIGS. 1 and 2, a cam shaft 1 as a slide member for an internal combustion engine has a base material 2 of a cast iron as a base member. A surface layer 4 is provided on an outer peripheral surface of a journal portion 3 of the base material 2. The surface layer 4 has a slide surface 4a for a bearing member 5 as a mating member.

The surface layer 4 is formed by an electro-plating process and is comprised of an aggregate of metal crystals belonging to a cubic system. A face-centered cubic structure and a body-centered cubic structure are included in the cubic system.

Examples of metal crystals having a face-centered cubic structure are single-metal crystals and alloy crystals such as Pb, Ni, Cu, Al, Ag, Au and the like. Examples of metal crystals having a body-centered cubic structure are single-metal crystals and alloy crystals such as Fe, Cr, Mo, W, Ta, Zr, Nb, V and the like.

Predetermined crystals in the metal crystals have a plane of (h00) by Miller indices directed toward a slide surface 4a to form the latter. The percent area A of the (h00) plane in the slide surface 4a is set in a range of $A \geq 50\%$.

If an orientation characteristic is provided to metal crystals of a cubic system so as to cause a (h00) plane to appear on the slide surface 4a in this manner, the metal crystal having the orientation characteristic become columnar crystals 7 extending from the journal portion 3, and tip ends of the columnar crystals 7 become quadrangular pyramid-shaped crystals 6 forming the slide surface 4a. The columnar crystals 7 may include ones extending from the base material 2 but broken off halfway, and ones extending further from such halfway broken-off columnar crystals. The same is true of columnar crystals which will be described hereinafter.

If the percent area A of the (h00) plane and thus of the quadrangular pyramid-shaped crystals 6 is set in a range of $A \geq 50\%$, as described above, apexes $a_1$ of the quadrangular pyramid-shaped crystals can be preferentially worn to improve the initial conformability of the surface layer 4. The surface area of the slide surface 4a can be increased by the quadrangular pyramid-shaped crystals 6, so that the surface layer 4 has a sufficient oil retention property. This makes it possible to enhance the seizure resistance of the surface layer 4. However, if the percent area A is less than 50% ($A \leq 50\%$), such an effect cannot be obtained, resulting in a reduced seizure resistance of the surface layer 4.

In addition, because the metal crystals are of the cubic system and due to the orientation of the (h00) plane, an increased atomic density is obtained in the direction of the orientation. Therefore, the surface layer 4 has an increased hardness, and the oil retention property can be provided to the surface layer 4, thereby assuring an enhanced wear resistance of the surface layer 4.

In order to obtain an excellent slide characteristic as describe above, the inclination of the columnar crystals becomes important.

Figure 3:
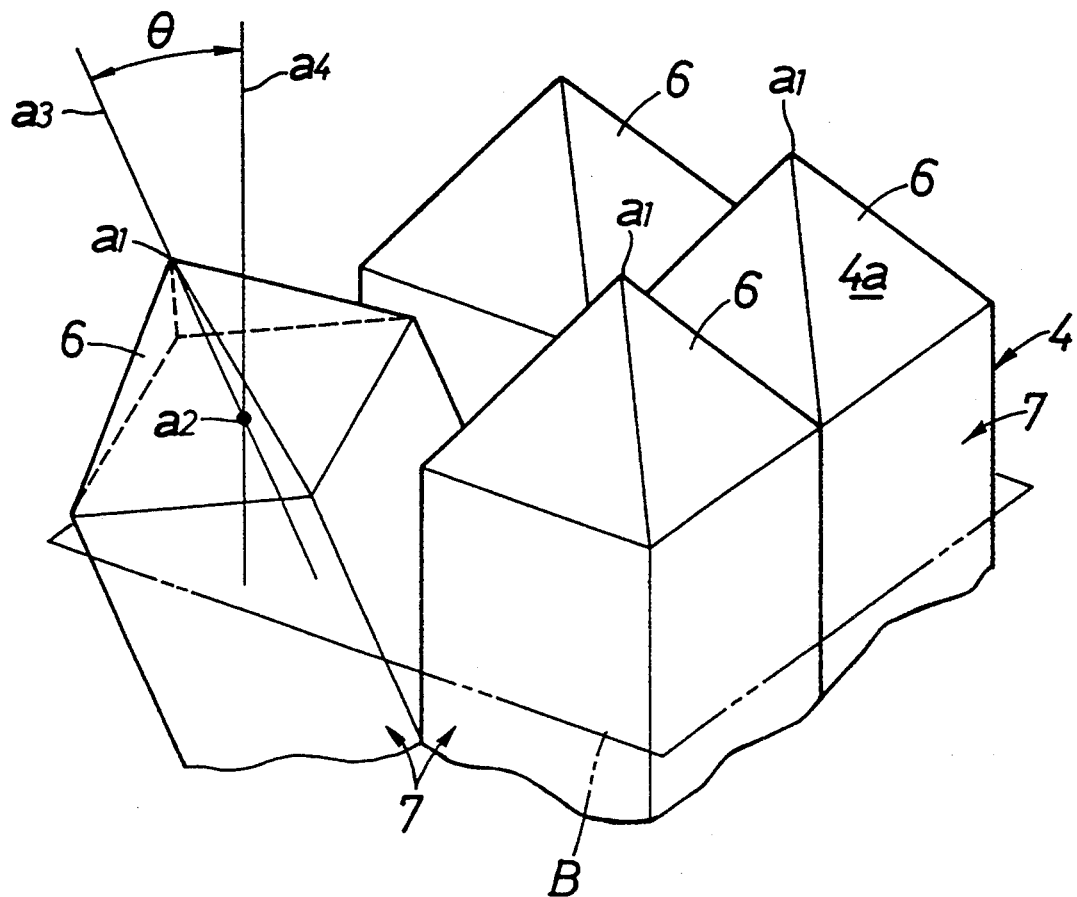
FIG. 3 is a schematic perspective view of an essential portion of a surface layer.
Figure 4:
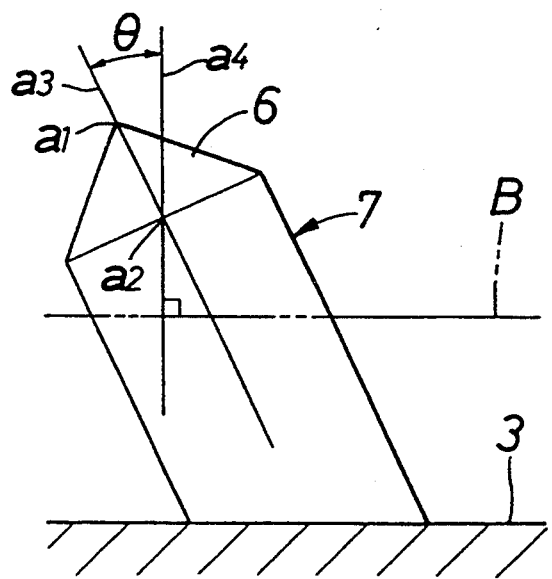
FIG. 4 is an illustration for explaining the measurement of the inclination angle of a columnar crystal.

Thereupon, when a phantom plane B extending along the slide surface 4a is defined below the slide surface on the base side of the crystals 6 as shown in FIGS. 3 and 4, and if an inclination angle defined by a straight line $a_3$ passing the apex $a_1$ and a central portion $a_2$ of the base surface of the quadrangular pyramid-shaped crystal 6 on the tip end with respect to a reference line $a_4$ passing the central portion $a_2$ of the base surface and extending perpendicular to the phantom plane B is defined as $\Theta$, the inclination angle e of the columnar crystal 7 is determined in a range of $0° \leq \Theta \leq 30°$. If the inclination angle $\Theta$ is larger than 30° ($\Theta > 30°$), the oil retention property of the surface layer 4 and the preferential wearing of the apex $a_1$ are reduced, resulting in reduced seizure and wear resistances of the surface layer 4.

Embodied examples will be described below.

The outer peripheral surface of the journal portion 3 of the base material 2 made of cast iron was subjected to an electro-plating process to form a surface layer 4 comprised of an aggregate of Ni crystals.

The conditions for the electro-plating process were as follows: the plating bath used was a mixed bath of nickel sulfate and nickel chloride; the pH of the plating bath was 4.5 or less (constant); the additive was boric acid and organic additive; the temperature of the plating bath was 50° C.; and the cathode current density of 9 A/dm².

Figure 5:
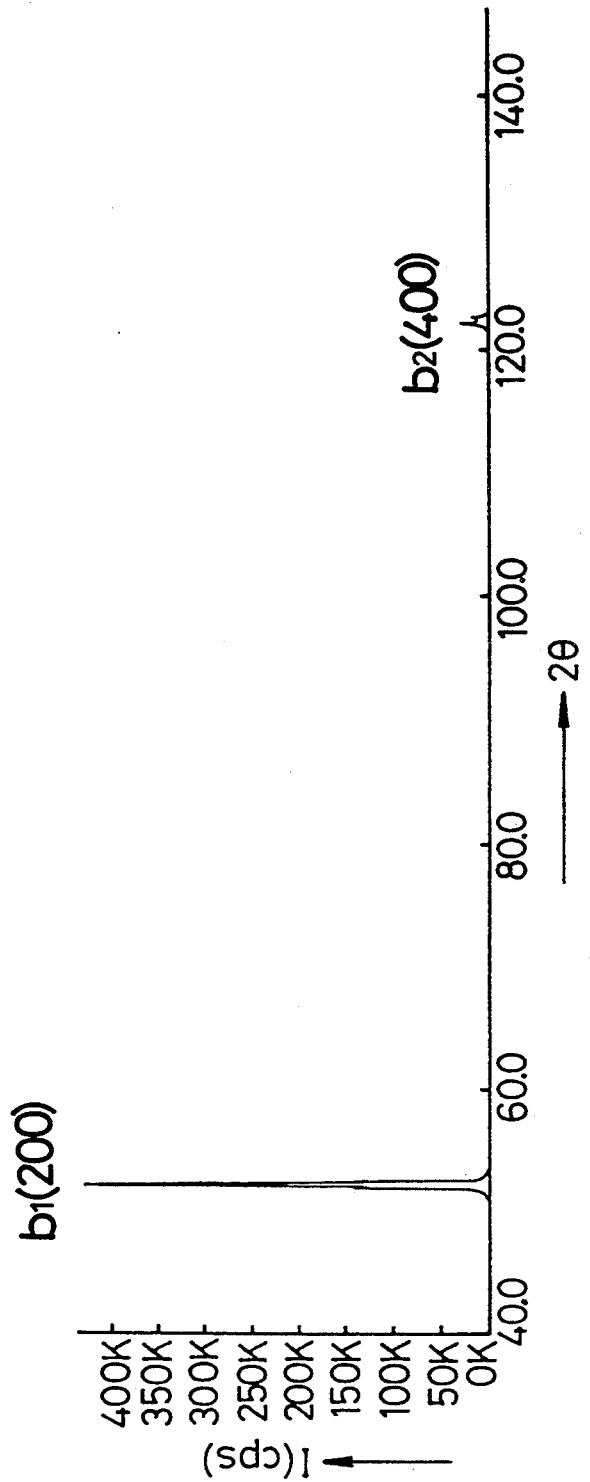
FIG. 5 is a pattern diagram of an X-ray diffraction for a Ni crystal in the surface layer.
Figure 4:

FIG. 5 is an X-ray diffraction pattern of Ni crystals, wherein a peak $b_1$ indicates a (200) plane, and a peak $b_2$ indicates a (400) plane, both the planes belonging to the (h00) plane. It can be seen from FIG. 5 that Ni crystals are present in the surface layer 4 and oriented so that their (h00) planes lie in a plane parallel to the phantom plane B extending along the slide surface 4a.

In this case, the greater the height of the peaks $b_1$ and $b_2$ and thus the greater the integrated strength is, the more the orientation degree of the Ni crystal is increased. This results in an increased percent area A of the (h00) plane in the slide surface 4a. The adjustment of the orientation degree is made by varying the conditions for the electro-plating process. In FIG. 5, the percent area A of the (h00) plane in the slide surface 4a is equal to 100% (A=100%).

Figure 6B:
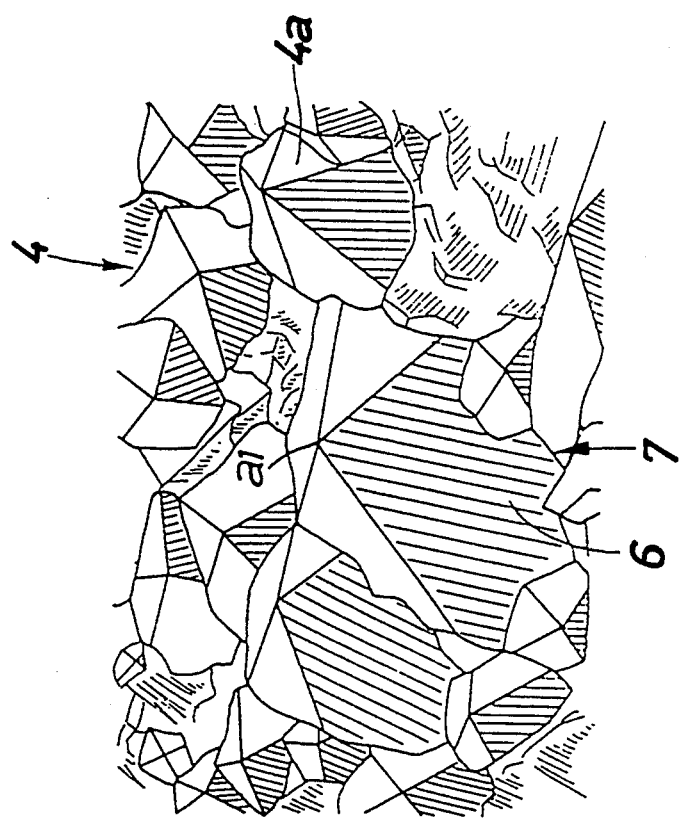
FIG. 6B is a schematic illustration taken from FIG. 6A.

FIG. 6A is an electron photomicrograph (5,000× magnification) showing a Ni crystal structure in the slide surface 4a, and FIG. 6B is a schematic illustration taken from FIG. 6A. It can be seen from FIG. 6B that the slide surface 4a has quadrangular pyramid-shaped crystals. The inclination angle $\Theta$ of each columnar crystal is in a range of $0° \leq \Theta \leq 30°$.

Figure 7:
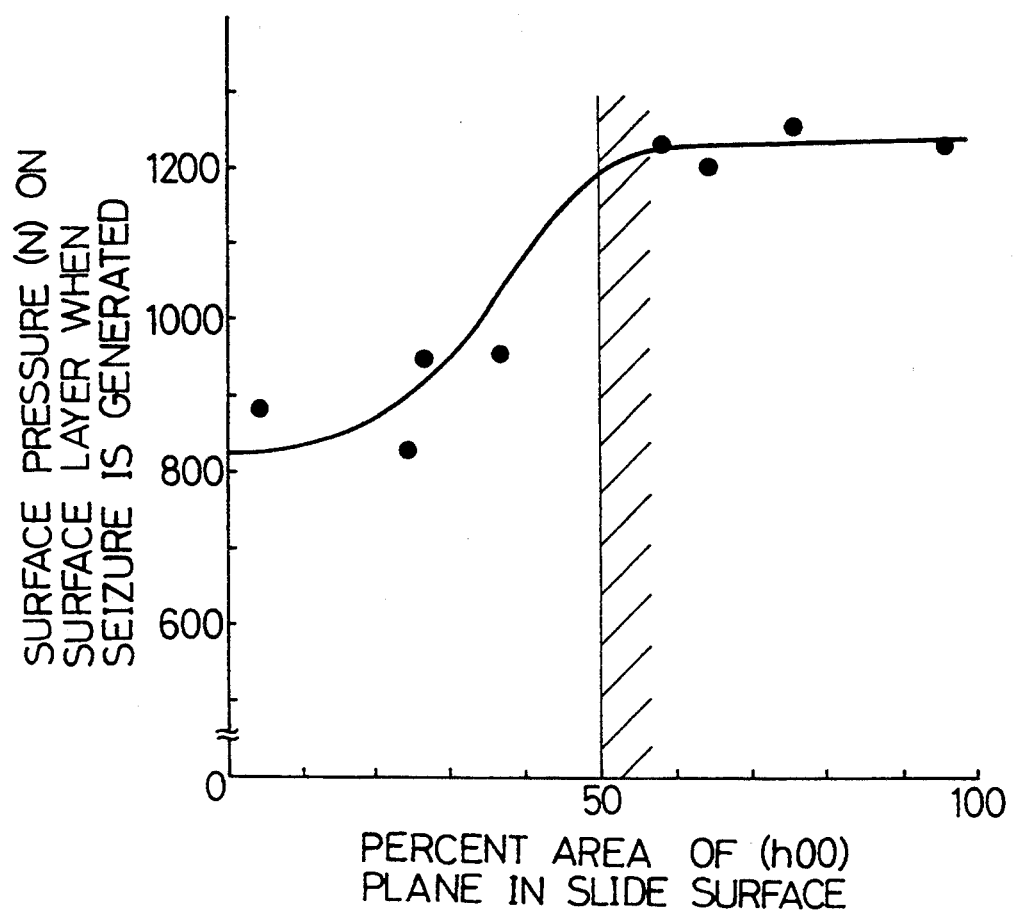
FIG. 7 is a graph illustrating a relationship between the percent area of a (h00) plane in the slide surface and the surface pressure of the surface layer when seizure is generated.

FIG. 7 illustrates results of a seizure test for the surface layer 4 comprised of Ni crystals. This test was made using a tip-on-disk testing machine, and the test conditions were as follows: the material used for a disk was a nitrided carbon steel material (S48C material); the number of revolutions of the disk was 10 m/sec.; and the oil supply rate was 40 cc/min. In FIG. 7, the seizure resistance was estimated by determining a force, in Newtons (N), applied to the tip when seizure was generated.

As apparent from FIG. 7, it is possible to improve the seizure resistance of the surface layer 4 by setting the percent area A of the (h00) plane in the slide surface 4a at a value of 50% or more ($A \geq 50\%$). It should be noted that the base material 2 may be formed of steel or an Al alloy.

The following is an example of a surface layer formed of Pb alloy and provided on an inner peripheral surface of that portion of a rocker arm for an internal combustion engine through which a rocker shaft is to be inserted.

The inner peripheral surface of that portion of a base material made of Al alloy through which a rocker shaft is to be inserted was subjected to an electro-plating process to form a surface layer comprised of an aggregate of crystals of Pb alloy.

The conditions for the electro-plating process were as follows: The plating bath was a boro-fluoride-based plating bath containing 100 g/liter of $Pb^{2+}$ and 10 g/liter of $Sn^{2+}$; the additive was boro-fluoric acid, boric acid and an organic additive; the temperature of the plating bath was 25° C.; the cathode current density was 8 A/dm².

Figure 8:
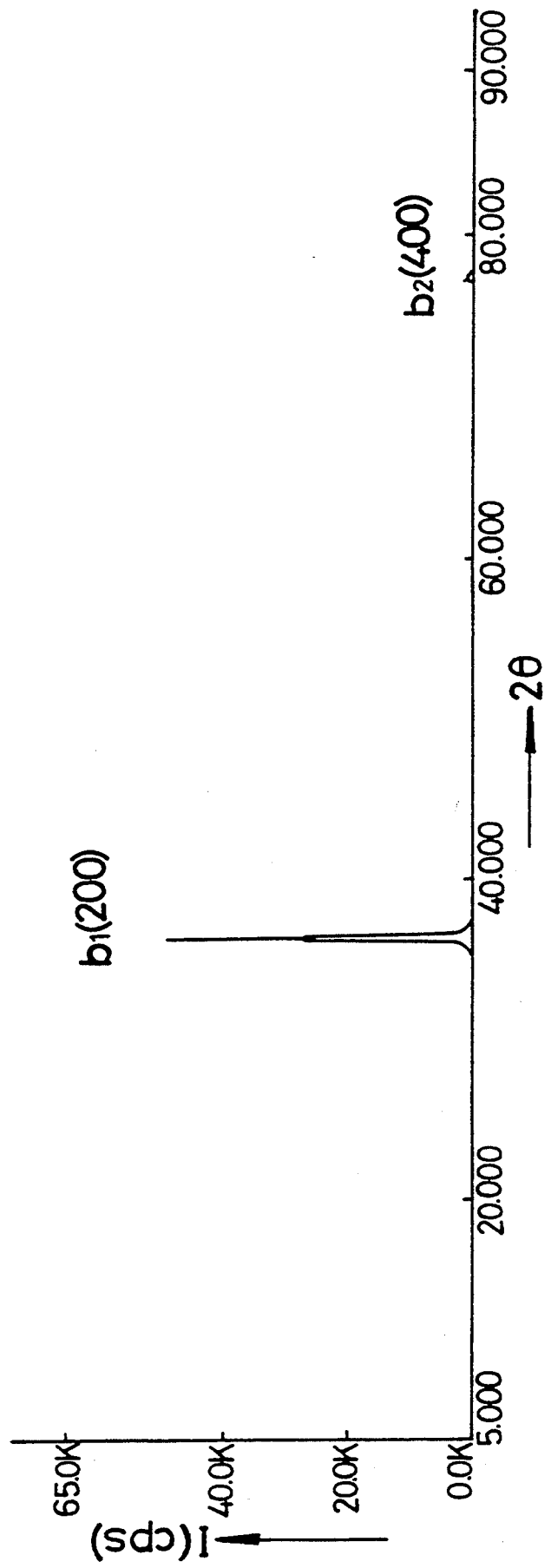
FIG. 8 is an X-ray diffraction pattern diagram for a Pb alloy crystal in the surface layer.

FIG. 8 is an X-ray diffraction pattern of a crystal structure of the Pb alloy in the surface layer, wherein a peak $b_1$ indicates a (200) plane, and a peak $b_2$ indicates a (400) plane, both the planes belonging to the (h00) plane. It can be seen from FIG. 8 that the surface layer is comprised of Pb alloy crystals oriented so that their (h00) planes lie in a plane parallel to the phantom plane B extending along the slide surface. Therefore, in this example, the percent area A of the (h00) plane in the slide surface is equal to 100% (A=100%).

Figure 9:
FIG. 9 is a photomicrograph showing a crystal structure of Pb alloy in the slide surface.
Figure 10:
FIG. 10 is a photomicrograph showing a crystal structure of a Pb alloy, taken through a longitudinal section of the surface layer.

FIG. 9 is an electron microphotograph (10,000× magnification) showing a crystal structure of the Pb alloy in the slide surface, and FIG. 10 is an electron microphotograph (5,000× magnification) showing a crystal structure of the Pb alloy in a longitudinal section of the surface layer. It can be seen from FIGS. 9 and 10 that the surface layer is formed of an aggregate of columnar crystals, and the slide surface is formed of quadrangular pyramid-shaped crystals. The inclination angle $\Theta$ of each columnar crystal is in a range of $0°\leq\Theta\leq 10°$.

Figure 11:
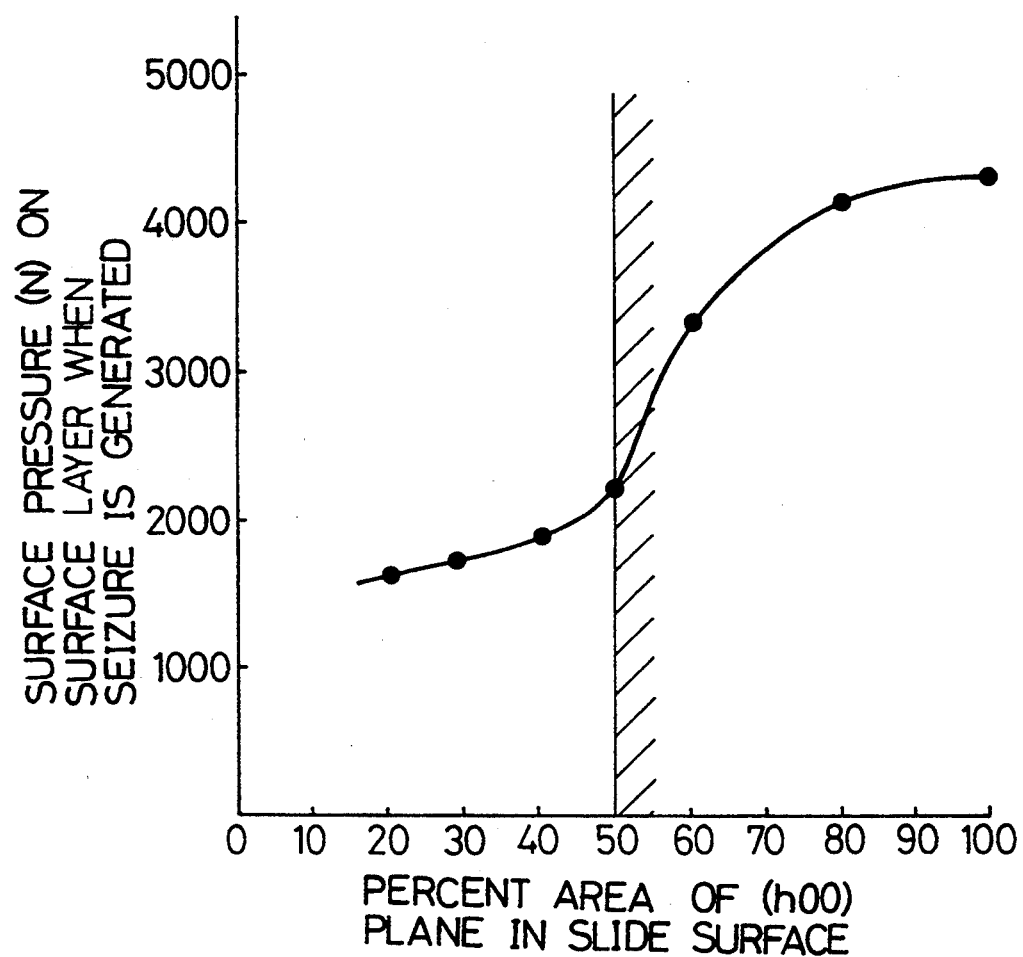
FIG. 11 is a graph illustrating a relationship between the percent area of the (h00) plane in the slide surface and the surface pressure of the surface layer when seizure is generated.

FIG. 11 illustrates results of a seizure test for the surface layer comprised of the Pb alloy crystals. This test was carried out using a tip-on-disk testing machine, and the test conditions were the same as those described above for the surface layer comprised of the Ni crystals.

As apparent from FIG. 11, the seizure resistance of the surface layer can be improved by setting the percent area A of the (h00) plane in the slide surface at a value equal to or more than 50% ($A\geq 50\%$).

The technology disclosed in the above-described first embodiment is not limited only to the above-described cam shaft and rocker arm, but is also applicable to slide members such as an engine crankshaft provided with a surface layer having metal crystals such as Ni crystals on a journal portion, and an engine piston provided with a surface layer having metal crystals such as Fe crystals on a skirt portion in a case wherein a piston made of Al alloy and a cylinder block made of Al alloy are used in combination.

FIGS. 12 to 20 illustrate a second embodiment of the present invention.

Figure 12:
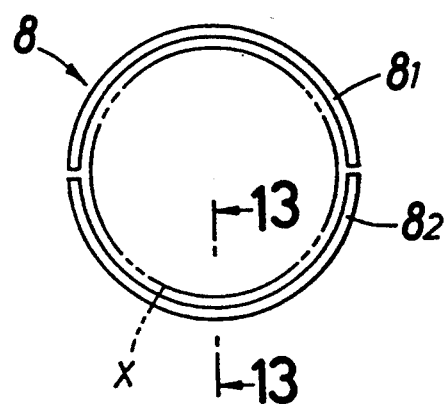
FIG. 12 is an exploded plan view of a slide bearing.
Figure 13:
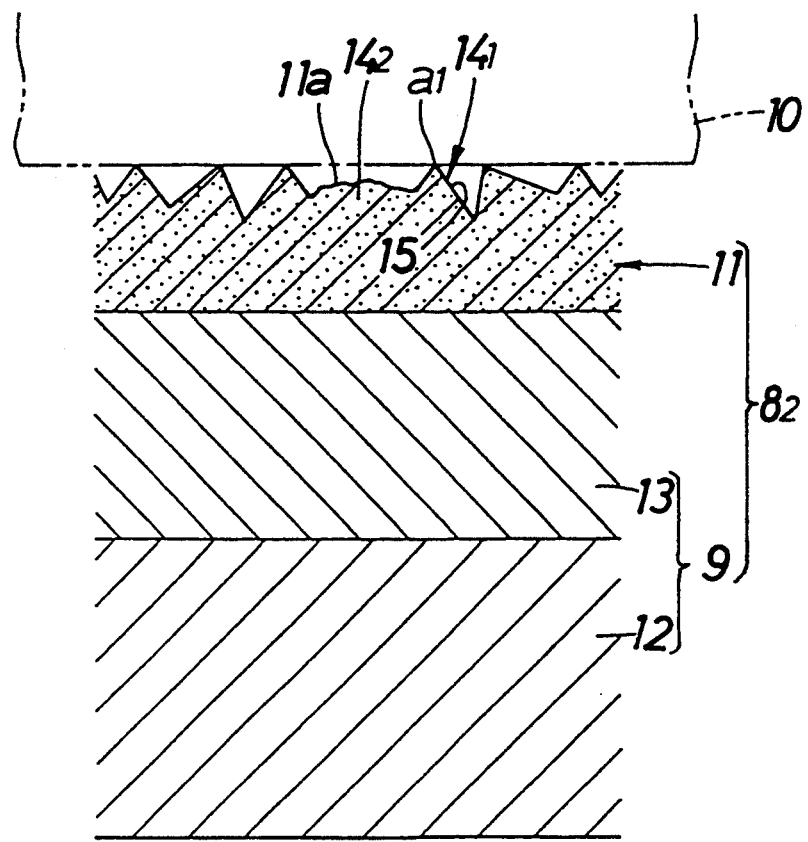
FIG. 13 is a sectional view taken along a line 13—13 in FIG. 12.

Referring to FIGS. 12 and 13, a slide bearing 8 as a slide member is applied to a journal portion of a crankshaft in an engine, and an enlarged end of a connecting rod or the like, and is comprised of a first half $8_1$ and a second half $8_2$. The halves $8_1$ and $8_2$ have the same structure and each comprises a base member 9, and a surface layer 11 formed on the base member 9 and having a slide surface 11a for a mating member 10. The base member 9 is comprised of a backing 12 and a lining layer 13 formed on a surface of the backing 12 to carry the surface layer 11 thereon. The surface layer 11 is formed by an electro-plating process. Optionally, a Cu deposit or plated layer may be provided between the backing 12 and the lining layer 13, and a Ni deposit or plated barrier layer may be provided between the lining layer 13 and the surface layer 11, if necessary.

The backing 12 is formed from rolled steel plate, and the thickness of the backing depends upon the set thickness of the slide bearing 8. The lining layer 13 is formed from copper, copper-based alloy, aluminum, aluminum-based alloy, etc., and the thickness of the lining layer 13 is in a range of 50 to 500 μm and normally on the order of 300 μm. The surface layer 11 is formed from an aggregate of crystals of Pb alloy, and the thickness of the surface layer 11 is in a range of 5 to 50 μm and normally on the order of 20 μm.

The Pb alloy forming the surface layer 11 contains Sn as a requisite alloy element and if necessary, may contain at least one element selected from the group consisting of Cu, Fe, Cr, Co, In, Ag, Tl, Nb, Sb, Ni, Cd, Te, Bi, Mn, Ca and Ba. Sn has a function to increase the strength of the surface layer 11. Each of Cu, Ni, Mn, Fe, Cr and Co has a function to increase the hardness of the surface layer 11. Further, each of In, Ag, Tl, Nb, Sb, Cd, Te, Bi, Ca and Ba has a function to soften the surface layer 11 to provide an improved initial comformability.

The surface layer 11 has first oriented crystals with a plane of (h00) by Miller indices directed so as to define the slide surface 11a. The first oriented crystals have a function to enhance the slide characteristic of the surface layer 11. In addition to the first oriented crystals, in some cases, the surface layer 11 may also have second oriented crystals with planes of (111) and (222) by Miller indices thereof directed toward the slide surface.

In the Pb alloy crystal, the (h00) plane and the (111) plane (including the (222) plane) are in a relationship that if one of these planes is increased, the other plane is decreased. Therefore, except for the case where the surface layer 11 is comprised of only the first oriented crytals, a consideration must be given with the first and second oriented crystals interrelated.

With this respect in view, the presence rate of the first oriented crystals in the surface layer 11 is set in the following manner:

If the integrated strength of the first oriented crystals with the plane of (h00) by Miller indices directed toward the slide surface 11a is represented by I(a), and the integrated strength of the second oriented crystals with the planes of (111) and (222) by Miller indices directed toward the slide surface 11a is represented by I(b), under application of X-ray diffractometry to the surface layer 11, the following relation is established:

$$0.5\leq I(a)/\Sigma I(ab)\leq 1.0$$

wherein $\Sigma I(ab)=I(a)+I(b)$; $I(b)=0$ is included; and $I(a)/\Sigma I(ab)$ is a presence rate $R_1$ of the first oriented crystals.

Figure 14:
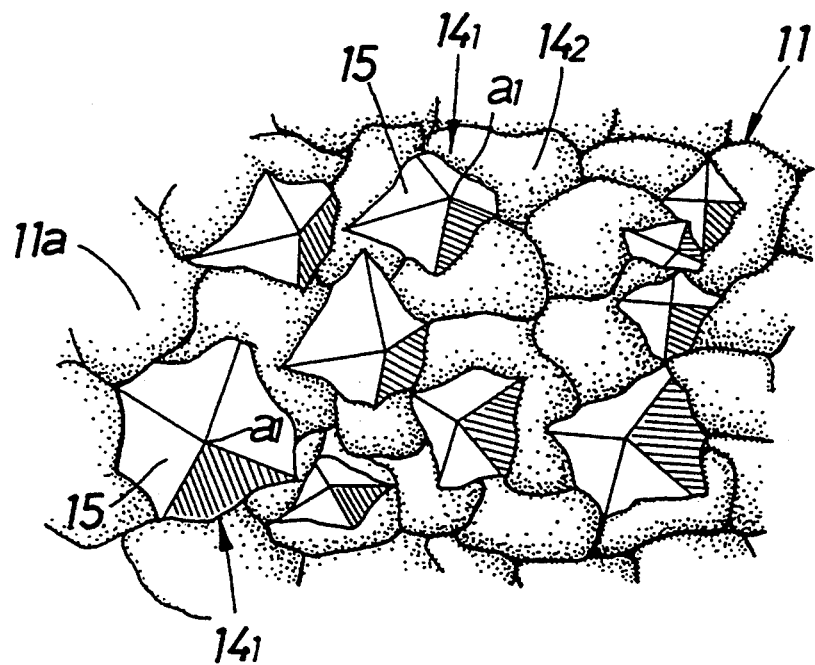
FIG. 14 is a schematic view of an essential portion of the slide surface.
Figure 15:
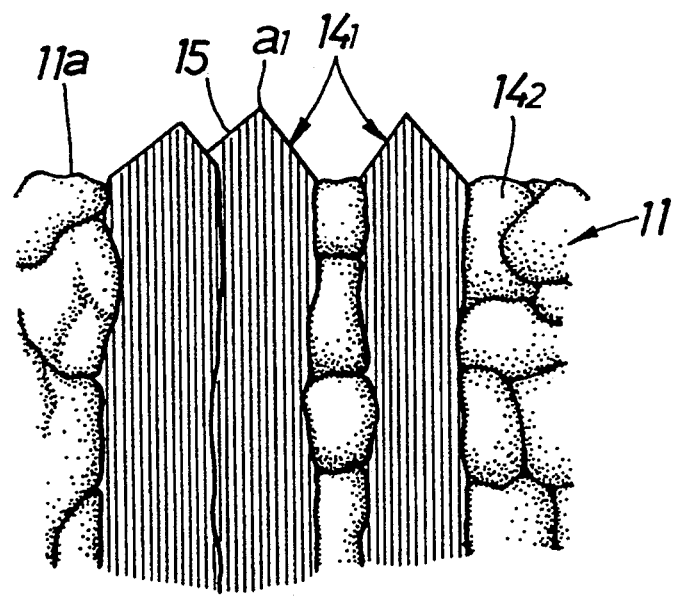
FIG. 15 is a schematic longitudinal section view of an essential portion of the surface layer.

As shown in FIGS. 13 to 15, the first oriented crystals $14_1$ with the (h00) plane directed toward the slide surface are columnar crystals extending from the lining layer 13, and tip ends thereof are formed into quadrangular pyramid-shaped crystals 15 which define the slide surface 11a.

If the presence rate $R_1$ of the first oriented crystals $14_1$ is set in the above-described manner, the apexes $a_1$ of the quadrangular pyramid-shaped crystals 15 can be preferentially worn in use to provide an improved initial conformability of the surface layer 11, and the surface area of the slide surface 11a can be increased by the quadrangular pyramid-shaped crystals 15, so that the surface layer 11 has a sufficient oil retention property. This enables the seizure resistance of the surface layer 11 to be enhanced.

From the respect that the first oriented crystal $14_1$ has a face-centered cubic structure due to the orientation of the (h00) plane, the atomic density is increased in the direction of the orientation, so that the surface layer 11 has an increased hardness, and the oil retention property can be provided to the surface layer 11, thereby assuring an enhanced wear resistance of the surface layer 11. In FIGS. 14 and 15, reference number $14_2$ represents a second oriented crystal which is granular.

In order to provide an excellent slide characteristic as described above, the inclination angle $\Theta$ of the first oriented crystal $14_1$ is set in a range of $0°\leq\Theta\leq 30°$, as in the first embodiment (see FIGS. 3 and 4).

In connection with the composition of the surface layer 11, the content of Sn, which is a requisite alloy element, influences the presence rate $R_1$ of the first oriented crystals $14_1$.

Figure 16:
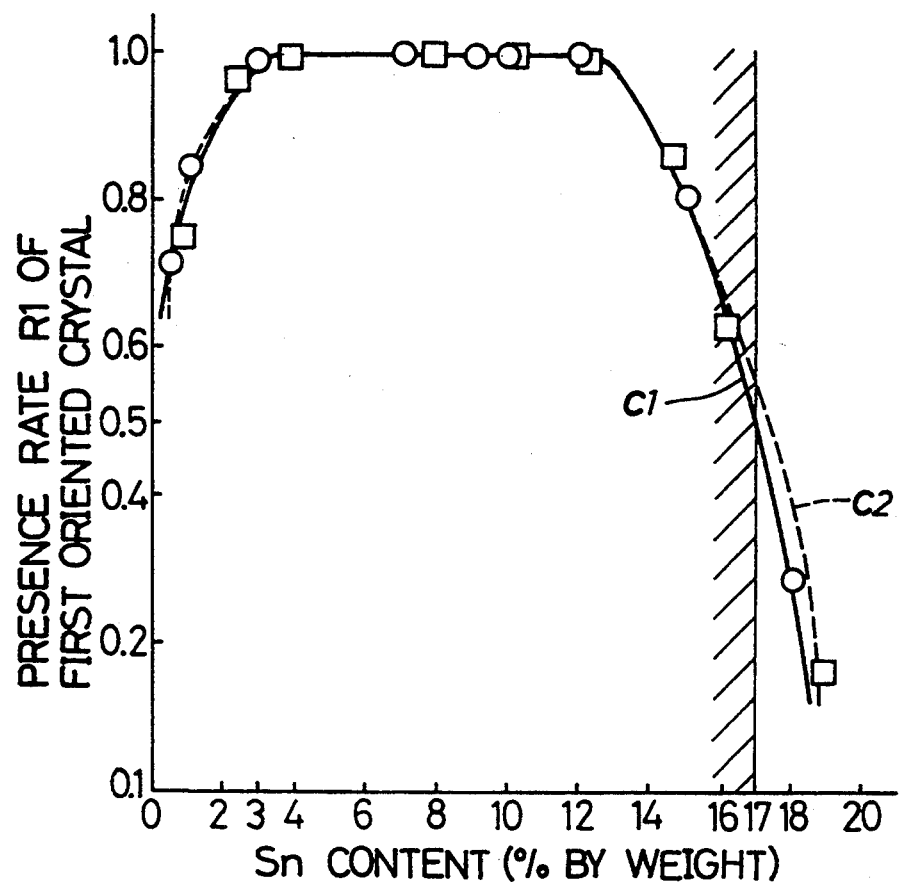
FIG. 16 is a graph illustrating a relationship between the Sn content and the presence rate of first orientated crystals.

FIG. 16 illustrates a relationship between the Sn content and the presence rate $R_1$ of the first oriented crystals $14_1$. As apparent from a solid line $c_1$ in FIG. 16, the presence rate $R_1$ can be maintained at $R_1\geq 0.5$, i.e., at a level equal to or more than 50% when the Sn content is not more than 17% by weight. A preferred range of the Sn content is from 3% by weight (inclusive) to 12% by weight (inclusive).

A dotted line $c_2$ in FIG. 16 indicates a case wherein the surface layer includes third oriented crystals which adversely effect the slide characteristic, in addition to the first and second oriented crystals $14_1$ and $14_2$. The third oriented crystals will be described hereinafter, and results indicated by the dotted line $c_2$ are obtained by setting the presence rate $R_2$ of the third crystals at a level equal to or less than 0.2 ($R_2 \leq 0.2$). Even in this case, the Sn content is set in the same manner as described above.

In forming the surface layer 11 by the electro-plating process, the plating solution used is preferably a borofluoride based plating solution containing 40 to 180 g/liter of $Pb^{2+}$, 1.5 to 35 g/liter of $Sn^{2+}$ and optionally, at most 15 g/liter of $Cu^{2+}$ and an additive. The additive which may be used is an organic additive which corresponds to at least one compound selected from the group consisting of a quinone-based compound such as hydroquinone, catechol, etc., an amino acid-based compound such as gelatin, peptone, etc., an aldehyde such as benzaldehyde, vanilline, etc. The amount of organic additive added is in a range of 1.5 to 18 g/liter as a total amount. If necessary, borofluoric acid and/or boric acid may be added to the plating solution for the purpose of adjusting the resistance of the fluid during energization. The temperature of the plating solution is set in a range of 5° to 35° C., and the cathode current density is set in a range of 3 to 15 A/dm².

An embodied example will be described below.

A lining layer 13 made of Cu alloy was subjected to an electro-plating process to form a surface layer 11 comprised of an aggregate of crystals of Pb alloy.

The conditions for the electro-plating process were as follows: the plating solution was a boro-fluoride plating solution containing 110 g/liter of $Pb^{2+}$, 10 g/liter of $Sn^{2+}$ and 2.5 g/liter of $Cu^{2+}$; the additive was an organic additive; the temperature of the plating solution was 25° C.; and the current density was 6 A/dm².

The composition of the surface layer 11 was comprised of 90% by weight of Pb 8% by weight of Sn and 2% by weight of Cu.

X-ray diffraction was carried out on the surface layer 11 to give results similar to those in FIG. 8. Therefore, only peaks of planes of (200) and (400) by Miller indices were observed in the X-ray diffraction pattern diagram. Both these planes belong to the (h00) plane. It was confirmed therefrom that the surface layer 11 was formed by only first oriented crystals $14_1$. In this case, the total integrated strength $\Sigma I(ab)$ is equal to 679,996 ($\Sigma I(ab) = 679,996$), with the proviso that $I(b) = 0$, and thus, the strength $\Sigma I(ab)$ is equal to the integrated strength $I(a)$ of the first oriented crystals $14_1$. Therefore, the presence rate $R_1$ of the first oriented crystals $14_1$ is equal to 1.0 ($R_1 = 1.0$).

The crystal structure of the Pb alloy in the surface layer 11 was examined by an electron microscope, and the result showed that the surface layer 11 has a crystal structure similar to those in FIGS. 9 and 10. Consequently, the surface layer 11 is comprised of first oriented crystals $14_1$ and thus of columnar crystals which have quadrangular pyramid-shaped crystals 15 forming the slide surface 11a. The inclination angle of the first oriented crystals $14_1$ was in a range of $0° \leq \Theta \leq 10°$.

Figure 17:
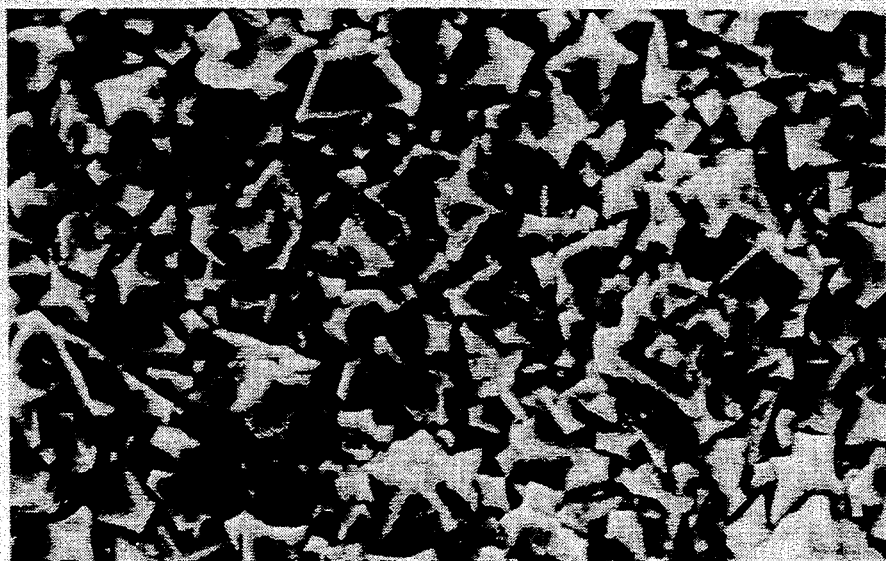
FIG. 17 is a photomicrograph showing a crystal structure of a Pb alloy in the slide surface.

FIG. 17 is an electron microphotograph (10,000× magnification) showing a crystal structure of a Pb alloy in another slide surface 11a. In FIG. 17, granular crystals, which are second oriented crystals $14_2$, are observed in addition to quadrangular pyramid-shaped crystals 15.

In FIG. 17, the integrated strength $I(a)$ of the first oriented crystals $14_1$ is equal to 37,172 ($I(a) = 37,172$), and the integrated strength $I(b)$ of the second oriented crystals $14_2$ is equal to 24,781 ($I(b) = 24,781$). Therefore, the presence rate $R_1$ of the first oriented crystals $14_1$ is 0.6 ($R_1 = 0.6$). The inclination angle $\Theta$ of the first oriented crystals $14_1$ is in a range of $0° \leq \Theta \leq 10°$.

Figure 18:
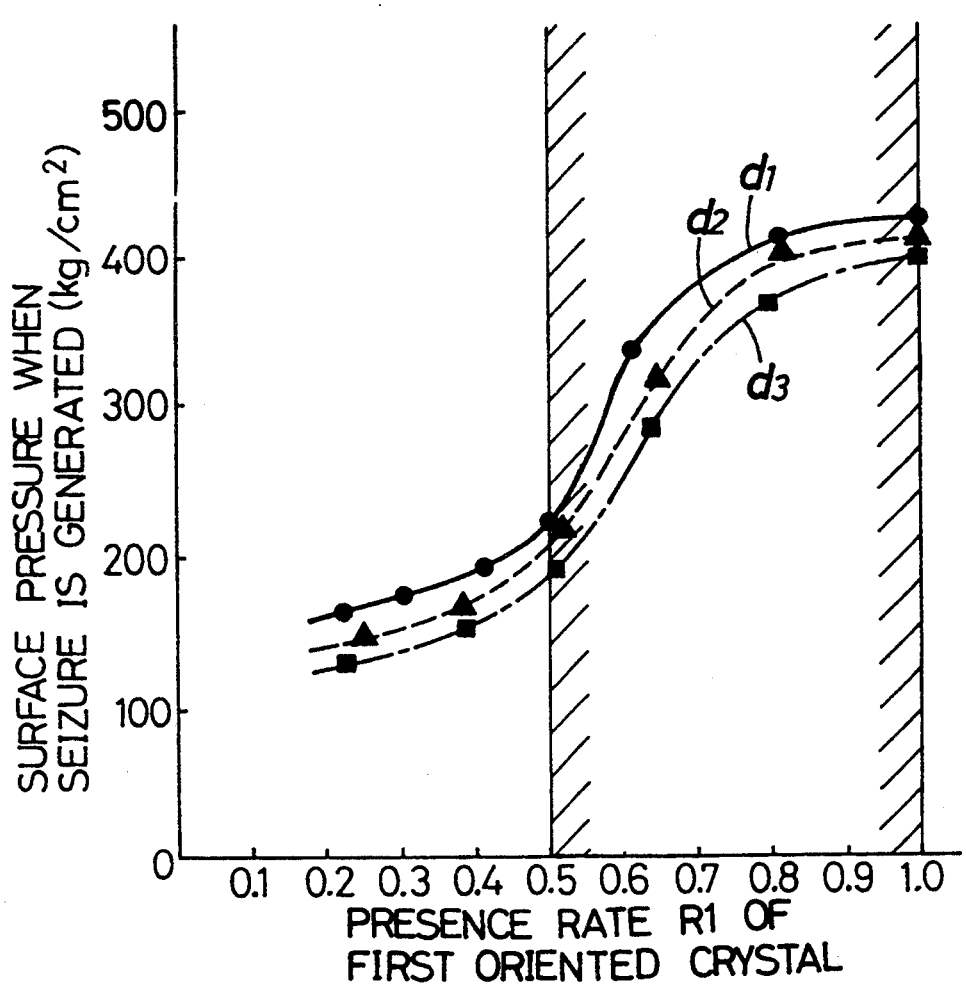
FIG. 18 is a graph illustrating a relationship between the presence rate of first oriented crystals and the surface pressure when seizure is generated.

FIG. 18 illustrates a relationship between the presence rate $R_1$ of the first oriented crystals $14_1$ and the surface pressure when seizure is generated for surface layers 11 of various slide bearings 8. In FIG. 18, a line $d_1$ corresponds to the relationship in a case where the inclination angle $\Theta$ of the first oriented crystals $14_1$ is in a range of $0° \leq \Theta \leq 10°$; a line $d_2$ corresponds to the relationship in a case where the inclination angle $\Theta$ of the first oriented crystals $14_1$ is in a range of $0° \leq \Theta \leq 20°$; and a line $d_3$ corresponds to the relationship in a case where the inclination angle $\Theta$ of the first oriented crystals $14_1$ is in a range of $0° \leq \Theta \leq 30°$.

The seizure test was carried out by bringing each of the slide bearings 8 into slide contact with a rotary shaft and gradually increasing the load applied to the slide bearing 8. FIG. 18 illustrates the surface pressure determined when seizure was produced in the surface layer 11 of each of the slide bearings 8.

The test conditions were as follows: the material used for a rotary shaft was a nitrided JIS S48C material; the number of revolutions of the rotary shaft was 6,000 rpm; the oil supply temperature was 120° C.; the oil supply pressure was 3 kg/cm²; and the applied load was 1 kg/sec.

As apparent from FIG. 18, the seizure resistance of the surface layer 11 can be improved by setting the presence rate $R_1$ of the first oriented crystals $14_1$ at a level equal to or more than 0.5 ($R_1 \geq 0.5$). A preferred range of the presence rate $R_1$ of the first oriented crystals $14_1$ is in a range of $0.8 \geq R_1 \geq 1.0$. It should be noted that the most excellent seizure resistance is exhibited if $R_1 = 1.0$.

In the surface layer 11, third oriented crystals, i.e., Pb metal crystals with a crystal face other than (h00), (111) and (222) planes being directed toward the slide surface, may be precipitated in some cases, as described above. Crystal faces of (220), (311), (331) and (420) planes by Miller indices are included in such crystal face. The third oriented crystals adversely affect the seizure resistance of the surface layer 11 and hence, it is necessary to suppress the presence rate of the third oriented crystals.

In view of these respects, the presence rate of the third oriented crystals in the surface layer 11 is set in the following manner:

Under application of X-ray diffractometry, if the integrated strength $I(a)$ of the first oriented crystals $14_1$ with a plane of (h00) by Miller indices directed toward the slide surface is represented by $I(a)$; the integrated strength of the second oriented crystals $14_2$ with planes of (111) and (222) by Miller indices directed toward the slide surface is represented by $I(b)$; and the integrated strength of the third oriented crystals with a crystal face other than planes of (h00), (111) and (222) by Miller indices directed toward the slide surface is represented by $I(c)$, the following relation is established:

$$I(c)/\Sigma I(abc) \leq 0.2$$

wherein $\Sigma I(abc) = I(a) + I(b) + I(c)$; $I(b) = 0$ is included; and $I(c)/\Sigma I(abc)$ is a presence rate $R_2$ of the third oriented crystals.

In the respect of the composition of the surface layer 11, the content of Cu, Ni, Mn, Fe, Cr, Co, Sb, Cd, Bi and Ca which are selective alloy elements affects the presence rate $R_2$ of the third oriented crystals.

Figure 19:
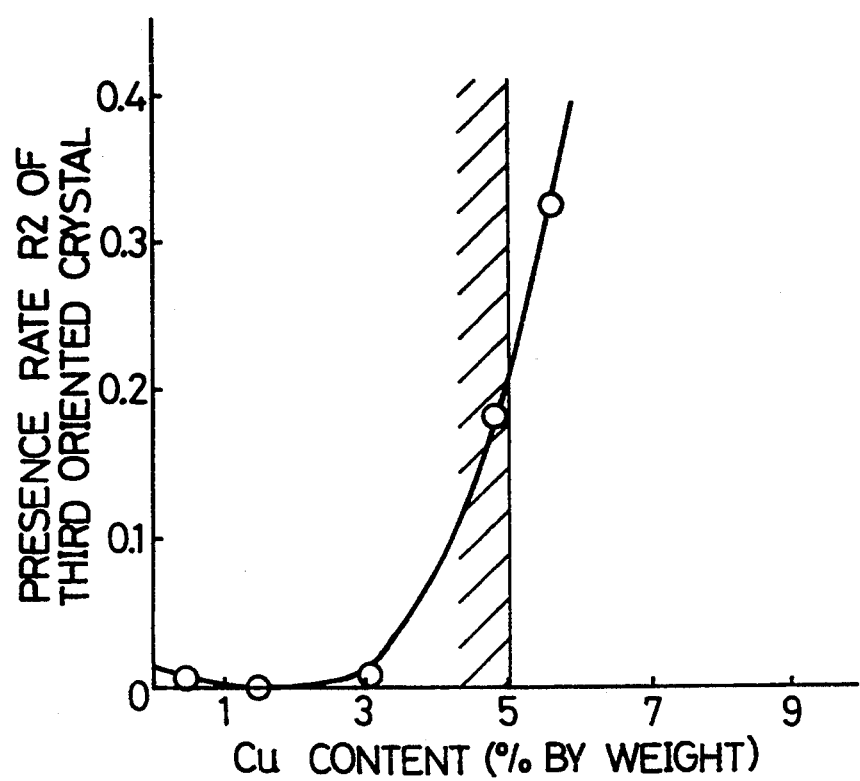
FIG. 19 is a graph illustrating a relationship between the Cu content and the presence rate of third oriented crystals.

FIG. 19 illustrates a relationship between the Cu content and the presence rate $R_2$ of the third oriented crystals. As apparent from FIG. 19, the presence rate $R_2$ can be maintained at 0.2 or less by setting the Cu content to at most 5% by weight. A preferred range of the Cu content is from 1% by weight (inclusive) to 3% by weight (inclusive). The content of other selective alloy elements such as Ni also shows the same tendency as does the Cu content.

Figure 20:
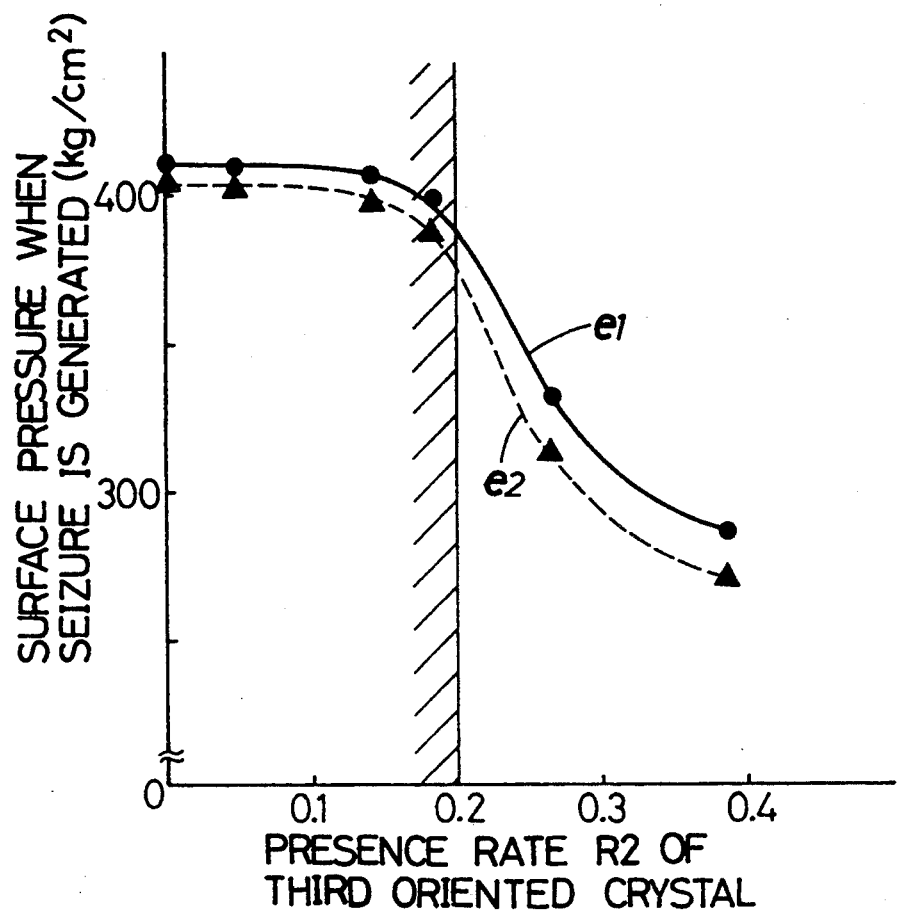
FIG. 20 is a graph illustrating a relationship between the presence rate of a third oriented crystals and the surface pressure when seizure is generated.

FIG. 20 illustrates a relationship between the presence rate $R_2$ of the third oriented crystals and the surface pressure at the generation of seizure for the surface layer of each of various slide bearings 8. The composition of the surface layer 11 comprises 90% by weight of Pb, 8% by weight of Sn, and 2% by weight of Cu. A line $e_1$ in FIG. 20 corresponds to the relationship in a case where the presence rate $R_1$ of the first oriented crystals $14_1$ is 1.0 ($R_1 = 1.0$) and hence, $I(b) = 0$, and the surface layer 11 is comprised of the first and third oriented crystals. A line $e_2$ corresponds to the relationship in a case where the presence rate $R_1$ of the first oriented crystals $14_1$ is 0.8 ($R_1 = 0.8$) and the surface layer 11 is comprised of the first, second and third oriented crystals. The seizure test was carried out in the same manner and under the same conditions as those described above.

As apparent from FIG. 20, the seizure resistance of the surface layer 11 can be improved by setting the presence rate $R_2$ of the third oriented crystals at a level equal to or less than 0.2 ($R_2 \leq 0.2$). The presence rate $R_2$ of the third oriented crystals is preferably equal to or less than 0.1 ($R_2 \leq 0.1$). It is to be noted that $R_2 = 0$ corresponds to the case where no third oriented crystal exists in the surface layer 11.

The optimal state of the surface layer 11 is achieved when the inclination angle $\Theta$ of the first oriented crystals $14_1$ is in a range of $0° \leq \Theta \leq 10°$ and when the presence rate $R_1$ of the first oriented crystals $14_1$ falls in a range determined by the following expression:

$$R_1 = I(a)/\Sigma I(ab) \geq 0.8$$

For the above-described selective alloy elements, the content of Ag, Nb, Te or Ba can be set at a value equal to or less than 10% by weight in order to avoid a reduction in strength of the surface layer 11.

When In or Tl of the above-described selective alloy elements is desired to be contained in the surface layer 11, a coating layer of In or the like may be formed on a Pb alloy plated layer, and subjected to a thermal treatment of 15 to 60 minutes at a temperature of 120° to 200° C., whereby In or the like is diffused into the Pb alloy deposit layer for alloying. If the content of In or the like is excessive, the surface layer 11 is excessively softened, resulting in a reduction in melting point and a reduction in strength of the surface layer 11. In addition, In or the like may form an intermetallic compound with another element such as Sn, Ni and Fe, to cause a ply separation. Thereupon, the content of In or Tl after diffusion is set in a range of from 0.5% by weight (inclusive) to 10% by weight (inclusive). The adjustment of such content may be effected by varying the thickness of the coating layer.

FIGS. 21 to 27 illustrate a third embodiment of the present invention.

Figure 21:
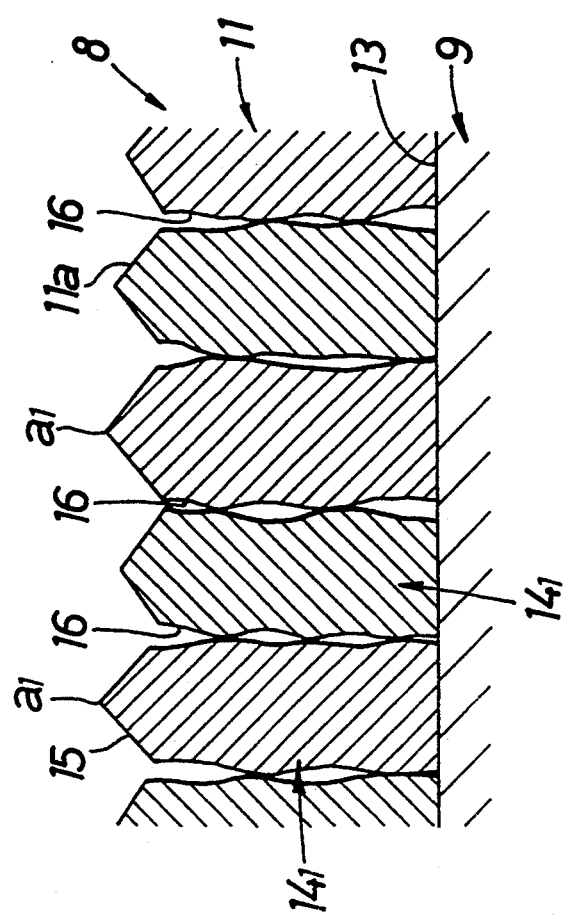
FIG. 21 is a schematic longitudinal sectional view of an essential portion of a surface layer.

As clearly shown in FIG. 21, a void 16 serving as an oil (i.e., lubricant) reservoir is defined between adjacent first oriented crystals $14_1$, i.e., adjacent columnar crystals in the surface layer 11 of the slide bearing 8 so as to be open to the slide surface $11a$. The percent area $A_1$ occupied by the openings of the voids 16 in the slide surface $11a$ is suitably in a range of $0.2\% \leq A_1 \leq 10\%$.

Table 1 illustrates the comparison of the example of the present invention and a comparative example in configuration and properties. The surface layer is made of Pb alloy containing 8% by weight of Sn and 2% by weight of Cu in both the example of the present invention and the comparative example.

The seizure test was carried out by bringing each slide bearing into slide contact with a rotary shaft and gradually increasing the load applied to the slide bearing. The surface pressure at the generation of seizure was determined when seizure was produced in the surface layer of the slide bearing.

The test conditions were as follows: the material used for a rotary shaft was a nitrided JIS S48C material; the number of revolutions of the rotary shaft was 6,000 rpm; the oil supply temperature was 120° C.; the oil supply pressure was 3 kg/cm$^2$; and the applied load was 1 kg/sec.

A wear test was carried out by bringing each slide bearing into slide contact with the rotary shaft through a given sliding distance and with application of a load to the slide bearing in the form of a dynamic load of a sinusoidal full-wave type synchronized with the rotary shaft.

The test conditions were as follows: the material used for the rotary shaft was a nitrided JIS S48C material; the number of revolutions of the rotary shaft was 3,000 rpm; the maximum applied load was 600 kg/cm$^2$ (projected area of the bearing: width × diameter); the sliding distance was $2.5 \times 10^3$ km; the oil supply temperature was 120° C.; and the oil supply pressure was 3 kg/cm$^2$.

Figure 22:
FIG. 22 is a photomicrograph showing a crystal structure of a Pb alloy in a slide surface after a wear test.
Figure 23:
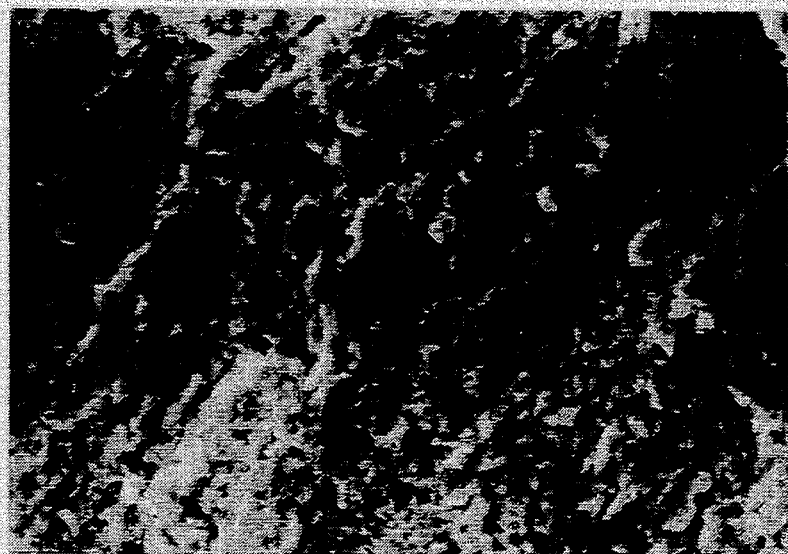
FIG. 23 is a photomicrograph showing a crystal structure of a Pb alloy of a slide surface in a comparative example after the wear test.

FIGS. 22 and 23 are electron microphotographs (10,000× magnification), each showing the crystal structure of the Pb alloy in the slide surface after the wear test, FIG. 22 corresponding to the example of the present invention, and FIG. 23 corresponding to the comparative example. In FIG. 22, many voids 16 can be observed in the example of the present invention.

TABLE 1

| | EXAMPLE OF THE INVENTION | COMPARATIVE EXAMPLE |
| --- | --- | --- |
| Crystal form | Columnar | Granular |
| Oe in (h00) plane (%) | 100 | 20 |
| Percent area occupied by openings of voids (%) | 3.5–4 | $\leq 0.1$ |
| Surface pressure when seizure is generated (Kg/cm$^2$) | 410 | 190 |
| Amount of wear (m) | 3.7 | 6.8 |

As apparent from Table 1 and FIG. 22, a large number of voids 16 serving as oil (or lubricant) reservoir means are opened to the slide surface $11a$ in the example of the present invention and therefore, the surface layer 11 can exhibit an excellent lubricating power, thereby assuring an improved seizure resistance thereof. In addition, the wear of the surface layer 11 can be substantially suppressed by a hardness-increasing effect for the surface layer 11 due to the lubricating power and the orientation index Oe of 100% in the (h00) plane.

Figure 24:
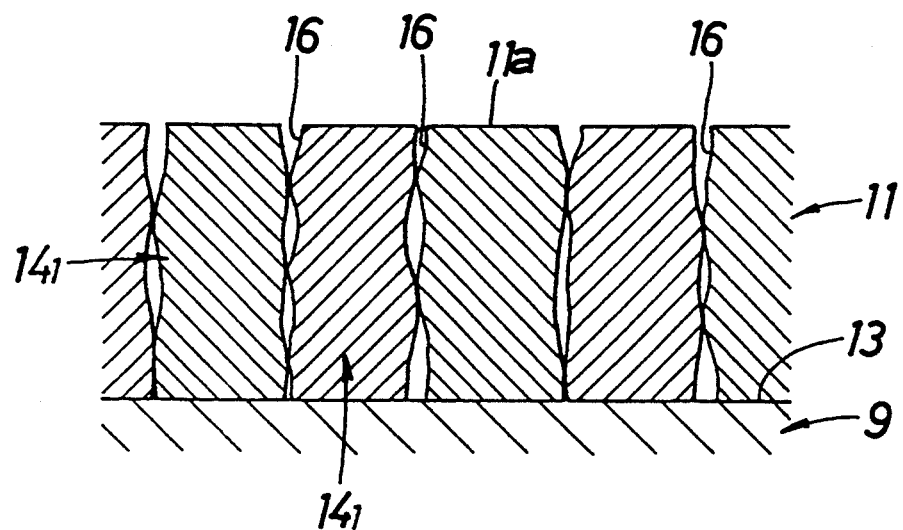
FIG. 24 is an illustration showing an essential portion of a surface layer in the course of progress of wearing, taken in longitudinal section.

As shown in FIG. 24, even in the course of progress of wear of the surface layer 11, a similar effect is obtained, because the voids 16 are opened at the slide surface 11a.

However, if the percent area $A_1$ occupied by the openings of the voids 16 is less than 0.2% ($A_1 < 0.2\%$), the lubricating power of the surface layer 11 is low. On the other hand, if $A_1 > 10\%$ the surface layer 11 has a reduced strength.

Figure 26:
FIG. 26 is a photomicrograph showing a crystal structure of the Pb alloy in the slide surface.

The excellent slide characteristic as described above can be obtained even when a tip end of the first oriented crystal $14_1$ is formed as a truncated quadrangular pyramid-shaped crystal 17. FIG. 26 is an electron photomicrograph (10,000× magnification) showing a crystal structure of a Pb alloy, when a slide surface 11a is formed of truncated quadrangular pyramid-shaped crystals 17. In this case, at least a portion of the slide surface 11a is formed by upper base surfaces 17a of the truncated quadrangular pyramid-shaped crystals 17, and this will ensure that an oil film can be formed between a mating member 10 and the upper base surface 17a from an initial stage of the sliding movement. This provides an improved initial conformability.

A slide bearing with a portion of its surface layer 11 being formed by first oriented crystals $14_1$ is included in the present invention. In this case, the percent area $A_3$ of end faces of the first oriented crystals 14 in the slide surface 11a is set in a range of $A_3 \geq 50\%$.

Figure 27:
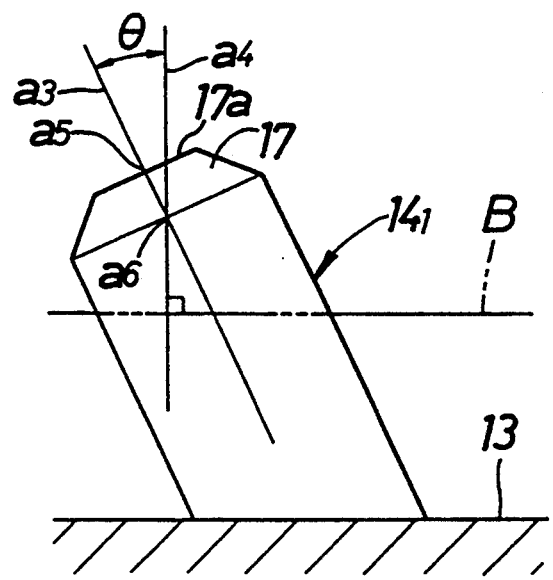
FIG. 27 is an illustration for explaining the measurement of the inclination angle of a columnar crystal.

The inclination angle Θ of the first oriented crystal $14_1$ having a truncated quadrangular pyramid-shaped crystal 17 is defined as an angle formed by two lines: a line $a_3$ passing a central portion $a_5$ of the upper base surface and a central portion $a_6$ of a lower base surface; and a reference line $a_4$ passing the central portion $a_6$ of the lower base surface and perpendicular to a phantom plane B, as shown in FIG. 27. Even in this case, the inclination angle Θ is set in a range of $0° \leq Θ \leq 30°$.

Figure 28:
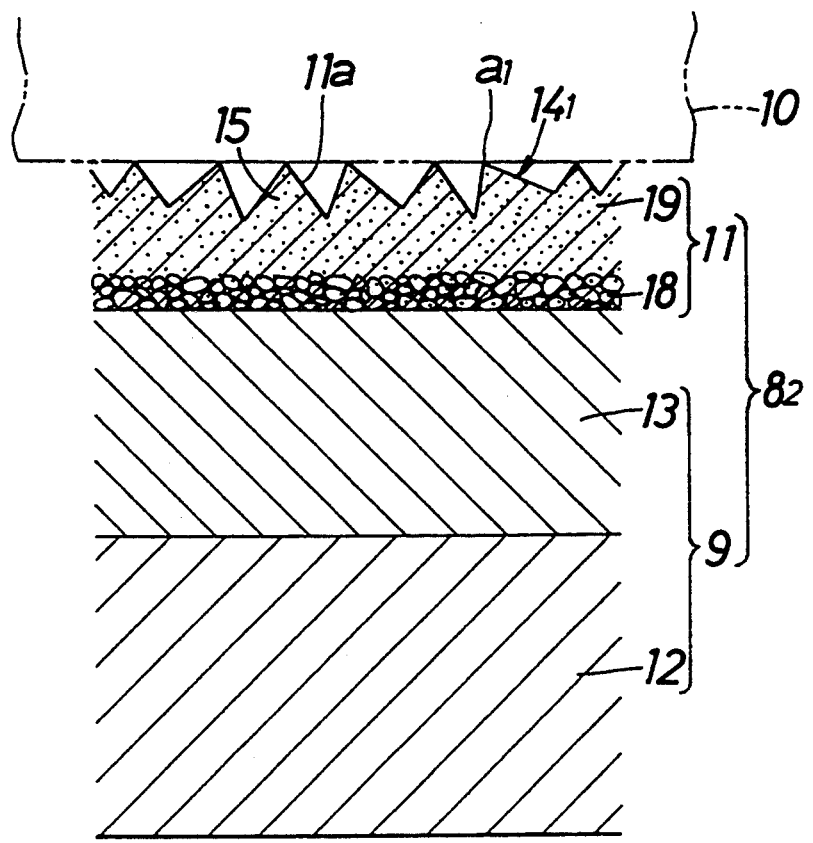
FIG. 28 is a schematic longitudinal sectional view of the essential portion of the surface layer.
Figure 32:
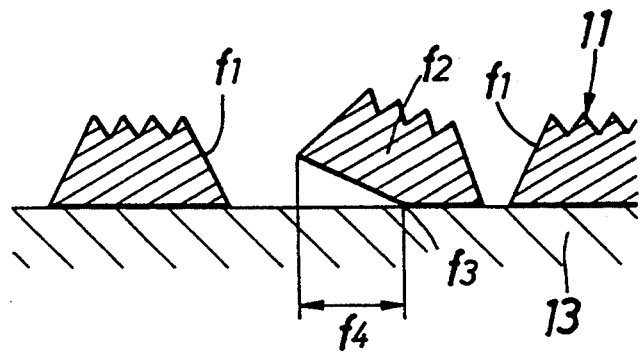
FIG. 32 is an illustration for explaining a peel test for the surface layer.

FIGS. 28 and 32 illustrate a fourth embodiment of the present invention.

Figure 29:
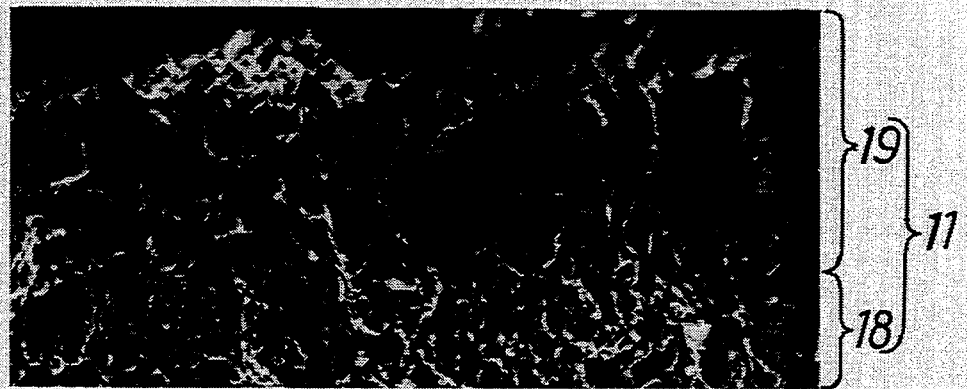
FIG. 29 is a photomicrograph showing a crystal structure of a Pb alloy, taken through longitudinal section of a surface layer.

FIG. 28 is a sectional view of a slide bearing 8 according to this embodiment and similar to FIG. 13. FIG. 29 is an electron microphotograph (2,000× magnification) showing a Pb alloy crystal structure taken through a longitudinal section of a surface layer 11. The surface layer 11 is made of Pb alloy containing 8% by weight of Sn and 2% by weight of Cu and formed on a lining layer 13 made of Cu alloy.

As apparent from FIGS. 28 and 29, the surface layer 11 is comprised of a base layer 18 precipitated on the lining layer 13, and a slide surface forming layer 19 precipitated on the base layer 18.

Figure 30:
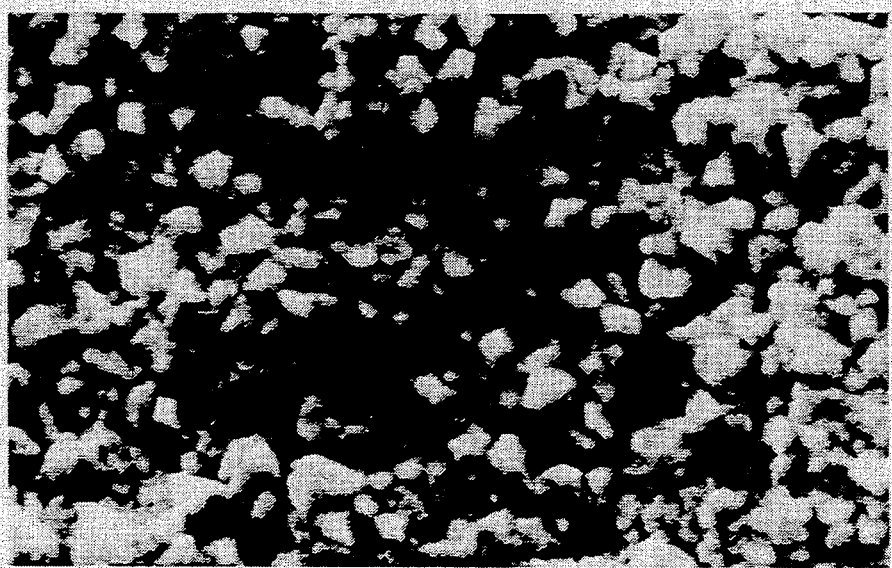
FIG. 30 is a photomicrograph showing a crystal structure of the Pb alloy in a surface of a base layer.

FIG. 30 is an electron photomicrograph (10,000× magnification) showing a Pb alloy crystal structure in a surface of the base layer 18. It can be seen from FIG. 30 that the base layer 18 has a dense aggregate of granular crystals. In the illustrated embodiment, the base layer 18 is formed from only granular crystals.

The slide surface forming layer 19 has a plurality of Pb alloy columnar crystals extending from the base layer 18, i.e., first oriented crystals $14_1$. In the illustrated embodiment, the slide surface forming layer 19 is formed from only the first oriented crystals $14_1$.

In forming such surface layer 11, a process is employed which comprising first precipitating and forming a base layer 18 on a lining layer 13 by electro-plating under a condition of cathode current density of 2 A/dm$^2$ and the precipitating and forming a slide surface-forming layer 19 on the base layer 18 by electro-plating under a condition of cathode current density of 8 A/dm$^2$.

The aggregate of granular crystals forming the base layer 18 is dense due to the low cathode current density during precipitation thereof. As a result, the base layer 18 is firmly adhered to the lining layer 13. On the other hand, the slide surface-forming layer 19 has a good adhesion to the base layer 18 because it is made from the same material as the base layer 18. This leads to an increased peel strength of the surface layer 11 with respect to the lining layer 13.

The slide surface-forming layer 19 has a sufficient oil retention property and will exhibit a good initial conformability by preferential wear of the apexes $a_1$, because it has the quadrangular pyramid-shaped crystals 15.

X-ray diffraction was carried out of the slide surface-forming layer 19 to provide a result similar to that shown in FIG. 8. Therefore, only diffraction peaks for planes of (200) and (400) by Miller indices were observed in the X-ray diffraction pattern diagram.

Here, if the orientation index Oe, an index indicative of an orientation characteristic of the crystal faces, is defined as follows:

$$Oe = Ihkl/\Sigma IhKl \times 100 \ (\%)$$

wherein hkl is a Miller index; Ihkl is an integrated strength of a (hkl) plane; and ΣIhkl is a sum of Ihkl, it is then concluded that the nearer to 100% the orientation index Oe is in a certain (hkl) plane, the more the amount of crystal faces oriented in the direction perpendicular to the (hkl) plane.

The integrated strength Ihkl and the orientation index Oe in the (200) and (400) planes of the Pb alloy crystas are as given in Table 2.

TABLE 2

| hkl | Integrated strength Ihkl | Orientation index Oe (%) |
|---|---|---|
| 200 | 631,414 | 92.9 |
| 400 | 48,582 | 7.1 |

As apparent from Table 2, the orientation index Oe in the (h00) plane of the Pb alloy crystals is 100% and therefore, the Pb alloy crystals have their crystal faces oriented in the directions of crystallographic axes a, b and c, i.e., in the (h00) plane.

If the crystal face is oriented in the direction perpendicular to the (h00) plane in this manner, the atomic density in the direction of the orientation becomes high, because the crystal structure of the Pb alloy is a face-centered cubic structure. Therefore, the slide surface-forming layer 19 has an increased hardness to exhibit enhanced seizure and wear resistances.

Figure 31:
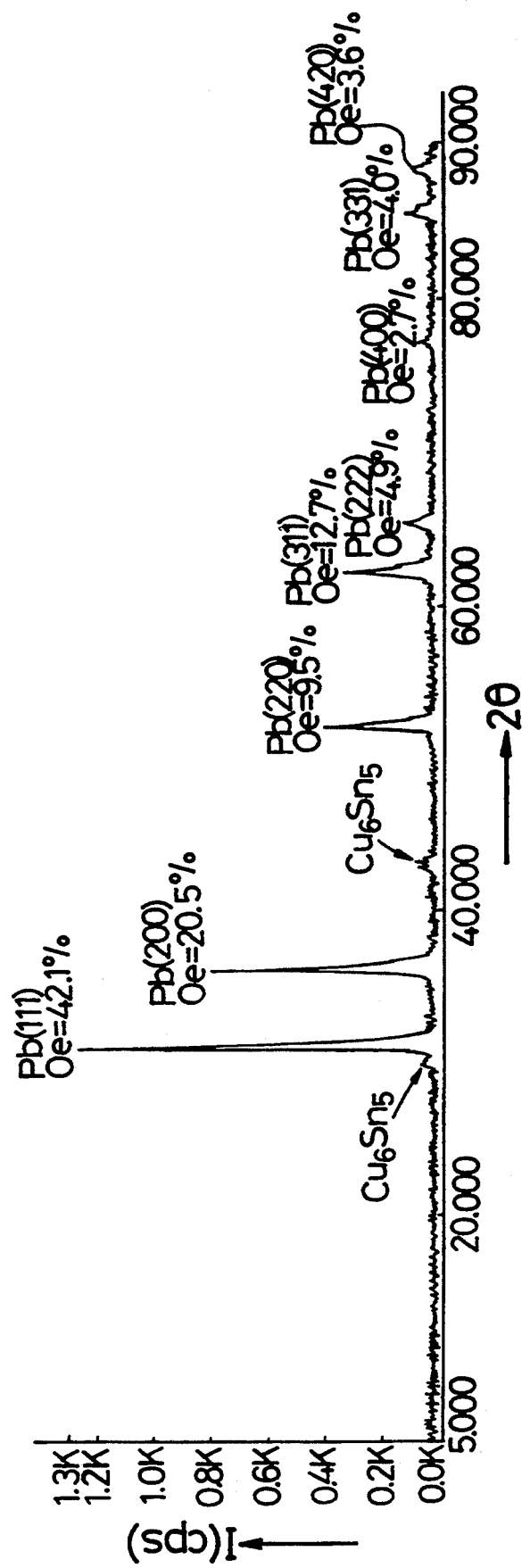
FIG. 31 is an X-ray diffraction pattern for Pb alloy crystals in the base layer.

FIG. 31 is an X-ray diffraction pattern diagram for the Pb alloy crystals in the base layer 18. No orientation to a particular crystal face is observed in FIG. 31. The integrated strengths and orientation indices in various (hkl) planes are as given in Table 3.

TABLE 3

| hkl | Integrated strength Ihkl | Orientation index Oe (%) |
|---|---|---|
| 111 | 31,987 | 42.1 |

TABLE 3-continued

| hkl | Integrated strength Ihkl | Orientation index Oe (%) |
|---|---|---|
| 200 | 15,548 | 20.5 |
| 220 | 7,233 | 9.5 |
| 311 | 9,609 | 12.7 |
| 222 | 3,730 | 4.9 |
| 400 | 2,083 | 2.7 |
| 331 | 3,038 | 4.0 |
| 420 | 2,723 | 3.6 |

As apparent from FIGS. 30 and 31 and Table 3, the Pb alloy crystals in the base layer 18 have irregular forms with their crystal faces oriented at random.

Table 4 illustrates the comparison of the example of the present invention and a comparative example (1) in peel strength of the surface layer. The surface layer in the comparative example (1) is formed of an aggregate of columnar crystals of a Pb alloy, as is the slide surface-forming layer 19 in the example of the present invention.

The peel strength was estimated by measuring the peel width, namely, the width or distance a peeling occurred. The measurement of the peel width was carried out by the following operations: by making cuts $f_1$ in checked manner in the surface layer 11; heating the resulting surface layer 11 at 180° C. for 6 hours and then cooling it; repeating the heating and cooling cycle five times; and subjecting the surface layer 11 to a ultrasonic cavitation. When a portion $f_2$ surrounded by one checked cut $f_1$ in the surface layer 11 was peeled off from the lining layer 13, the distance from the cut $f_1$ to an adhered edge portion $f_3$ was measured, and the maximum width was determined as a peel distance $f_4$.

TABLE 4

| | Peel width in surface layer (μm) |
|---|---|
| Example of the present invention | 3 |
| Comparative example (1) | 27 |

As apparent from Table 4, with the example of the present invention, the peel strength of the surface layer 11 can be increased by the presence of the base layer 18 formed of the dense aggregate of the granular crystals.

Table 5 illustrates the result of a seizure test for example of the present invention and a comparative example (2) corresponding to the prior art. In the comparative example (2), the Pb alloy crystals in the surface layer have irregular forms with their crystal faces oriented at random, as in the base layer 18 in the example of the present invention.

The seizure test was carried out by bringing each of the slide bearings into slide contact with a rotary shaft and gradually increasing the load applied to the slide bearing. Table 5 illustrates the surface pressure determined when seizure is produced in the surface layer of the slide bearing.

The test conditions were as follows: the material used for a rotary shaft was a nitrided JIS S48C material: the number of revolutions of the rotary shaft was 6,000 rpm; the oil supply temperature was 120° C.; the oil supply pressure was 3 kg/cm²; and the applied load was 1 kg/sec.

TABLE 5

| | Surface pressure of surface layer at generation of seizure (kg/cm²) |
|---|---|
| Example of the present invention | 420 |
| Comparative example (2) | 190 |

As apparent from Table 5, the example of the present invention has an excellent seizure resistance, as compared with the comparative example (2). The reason why such an effect is obtained is that the apexes $a_1$ of the quadrangular pyramid-shaped crystals 15 forming the slide surface 11a can be preferentially worn to provide an improved initial comformability of the surface layer 11, and that the surface area of the slide surface 11a is increased due to the quadrangular pyramid-shaped crystals 15, so that the surface layer 15 has a sufficient oil retention property. In this case, if the preferential wear of the apexes $a_1$ is completed at an initial stage of the sliding movement and a flat surface is formed thereby (which corresponds to an upper base surface of a truncated-quadrangular pyramid), an oil film is always present between such flat surface and a mating member and hence, any subsequent wear of the slide surface 11a will advance extremely slowly.

Figure 25:
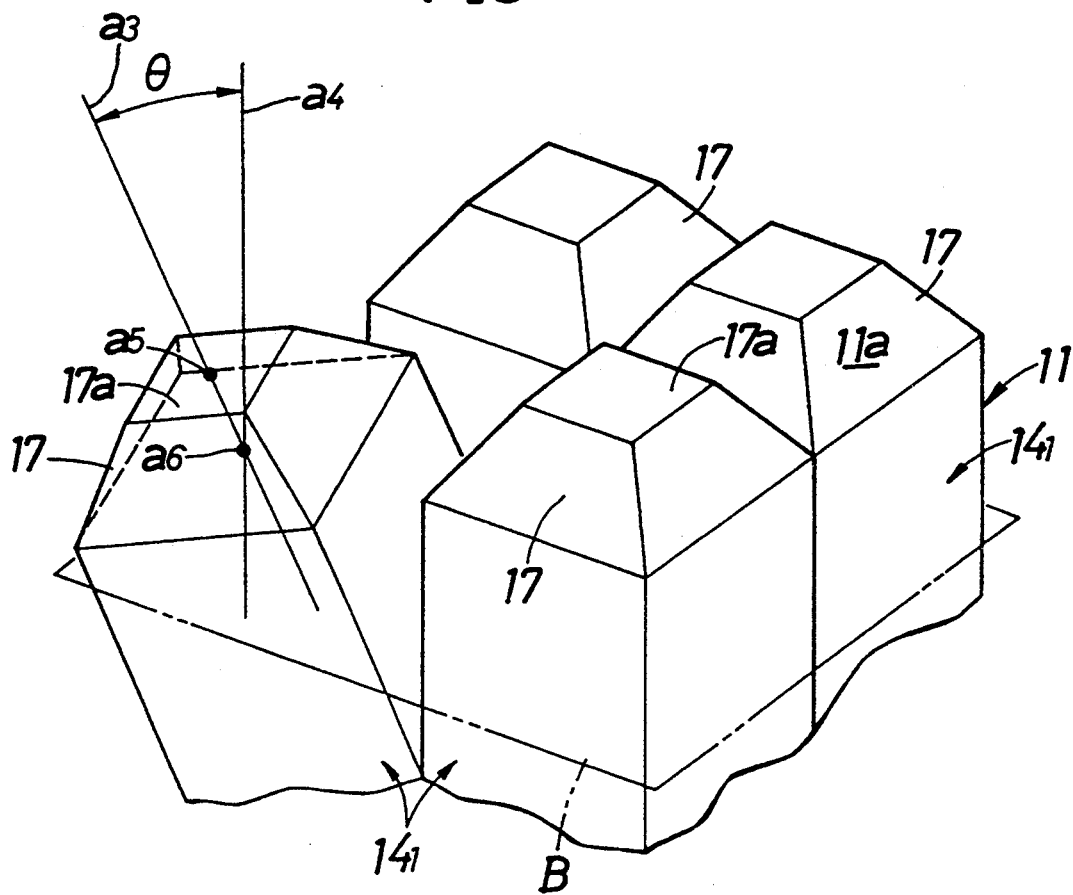
FIG. 25 is a schematic perspective view of an essential portion of the slide surface.

A slide characteristic similar to that described in the previous embodiments can also be obtained when a plurality of the first oriented crystals $14_1$ in the slide surface-forming layer 19 of the Pb alloy are formed of truncated-quadrangular pyramid-shaped crystals 17 only, as shown in FIGS. 25 to 27, or of a combination of such crystals 17 with quadrangular pyramid-shaped crystals 15.

A slide bearing with a portion of its slide surface 11a formed by quadrangular pyramid-shaped crystals 15 and/or truncated-quadrangular pyramid-shaped crystals 17 is also included in the present invention. In this case, the percent area $A_2$ of the quadrangular pyramid-shaped crystals 15 and/or the like in the slide surface 11a is set in the range $A_2 \geq 50\%$. The inclination angle $\Theta$ of the quadrangular pyramid-shaped crystals 15 and the truncated-quadrangular pyramid-shaped crystals 17 is set in a range of $0° \leq \Theta \leq 30°$, as in the previously described embodiments.

Figure 33:
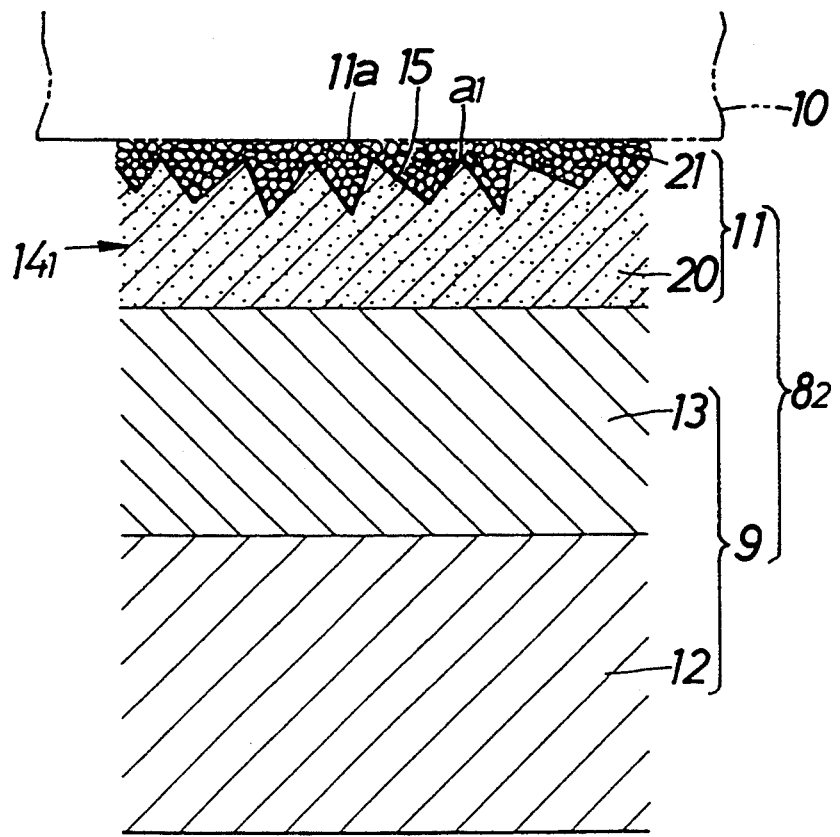
FIG. 33 is a schematic longitudinal sectional view of an essential portion of the surface layer.
Figure 34:
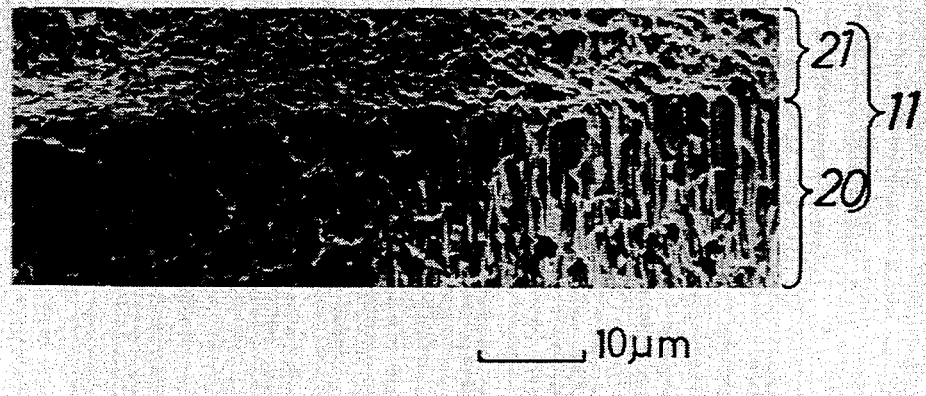
FIG. 34 is a microphotograph showing a crystal structure of the Pb alloy, taken through longitudinal section of the surface layer.
Figure 35:
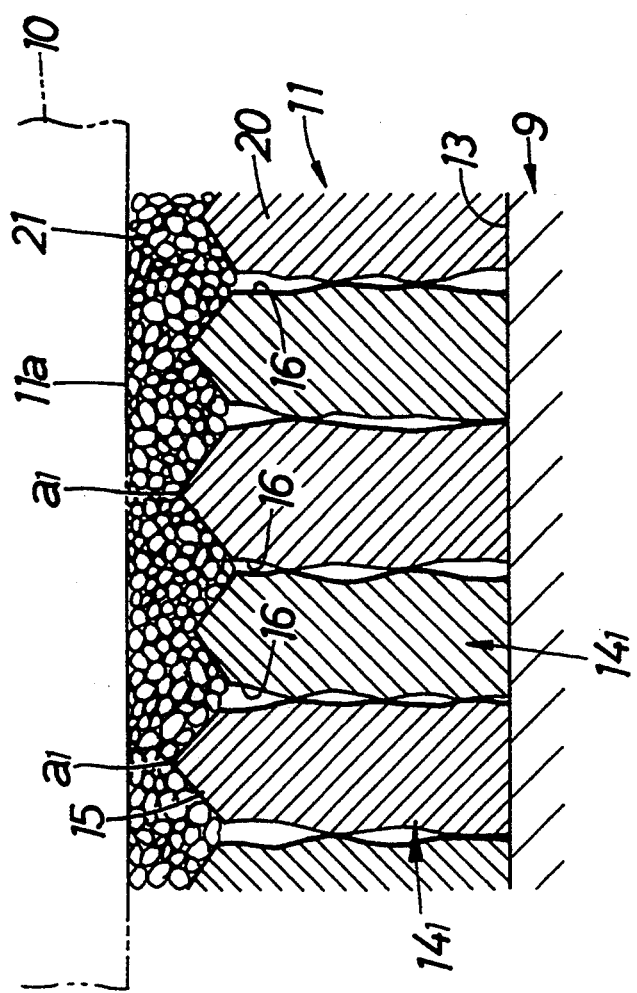
FIG. 35 is a schematic longitudinal sectional view of an essential portion of the surface layer.

FIGS. 33 to 35 illustrate a fifth embodiment of the present invention.

FIG. 33 is a sectional view of a slide bearing of this fifth embodiment and similar to FIG. 13. FIG. 34 is an electron microphotograph (1,500× magnification) showing a Pb alloy crystal structure taken in a longitudinal section of a surface layer 11. FIG. 35 is a schematic longitudinal sectional view of an essential portion of the surface layer 11 shown in FIG. 34. The surface layer 11 is made of a Pb alloy containing 8% by weight of Sn and 2% by weight of Cu and formed on a lining layer 13 of Cu alloy.

As apparent from FIGS. 34 and 35, the surface layer 11 is comprised of a primary layer 20 precipitated and formed on the lining layer 13, and a secondary layer 21 precipitated and formed on the primary layer 20.

The primary layer 20 has a plurality of Pb alloy columnar crystals extending in proximity to one another from the lining layer 13, namely, first oriented crystals $14_1$. In the illustrated embodiment, the primary layer 20 is formed of only the first oriented crystals $14_1$. A void 16 is formed between adjacent first oriented crystals $14_1$ and open to the slide surface 11a to serve as an oil (i.e., lubricant) reservoir. The percent area $A_1$ occupied by openings of the voids 16 in a cross section parallel to the slide surface 11a is suitably in a range of $0.2\% \leq A_1 \leq 10\%$.

The crystal structure of the Pb alloy in the surface of the secondary layer 21, i.e., in the slide surface 11a is similar to that shown in FIG. 30. Therefore, the second layer 21 has an aggregate of granular crystals. In the illustrated embodiment, the secondary layer 21 is formed of only the granular crystals.

In forming such a surface layer 11, a process is employed which comprises precipitating and forming a primary layer 20 on a lining layer 13 by electro-plating with cathode current density of 8 $A/dm^2$ and precipitating and forming a secondary layer 21 on the primary layer by electro-plating with cathode current density of 2 $A/dm^2$. In this case, the surface of the primary layer 20 is formed of quadrangular pyramid-shaped crystals 15, so that the surface of the primary layer 20 exhibits an anchoring effect for the secondary layer 21, thereby providing a good adhesion of the secondary layer 21 to the primary layer 20.

X-ray diffraction for the primary layer 20 was carried out and a result similar to that shown in FIG. 31 was obtained. In the X-ray diffraction pattern diagram, only diffraction peaks for planes of (200) and (400) by Miller indices were observed. Therefore, the orientation index Oe of the Pb alloy crystals in the (h00) plane is likewise 100%.

If the crystal face is oriented in a direction perpendicular to the (h00) plane in this manner, an increased atomic density is obtained in the direction of the orientation because the Pb alloy crystal structure is a face-centered cubic structure, so that the primary layer 20 has an increased hardness, leading to enhanced seizure and wear resistance thereof. The hardness Hmv of the primary layer 20 is in a range of 20 to 25.

X-ray diffraction for the secondary layer 21 was carried out to provide a result similar to that shown in FIG. 31. Therefore, the crystals of the Pb alloy in the secondary layer 21 have irregular forms with their crystal faces oriented at random in the same manner as described above. Due to this, the hardness of the Pb alloy is lower than that of the Pb alloy having the orientation in the (h00) plane. The hardness Hmv of the secondary layer 21 is in a range of 10 to 15.

Table 6 illustrates the comparison of an example of the present invention and a comparative example in configuration and performance of the surface layer. The composition of the surface layer is the same in both the example of the present invention and the comparative example.

The seizure test was carried out by bringing each of the slide bearings into sliding contact with a rotary shaft and gradually increasing the load applied to the slide bearing. The surface pressure given in Table 6 was determined when seizure was produced.

The test conditions were as follows: the material used for a rotary shaft was a nitrided JIS S48C material; the number of revolutions of the rotary shaft was 6,000 rpm; the oil supply temperature was 120° C.; the oil supply pressure was 3 $kg/cm^2$; and the applied load was 1 kg/sec.

A wear test was carried out by bringing each slide bearing into slide contact with the rotary shaft through a given sliding distance and with application of a load to the slide bearing in the form of a dynamic load of a sinusoidal full-wave type synchronized with the rotary shaft.

The test conditions were as follows: the material used for a rotary shaft was a nitrided JIS S48C material; the number of revolutions of the rotary shaft was 3,000 rpm; the maximum applied load was 600 $kg/cm^2$ (projected area of bearing: width×diameter); the sliding distance was $2.5 \times 10^3$ km; the oil supply temperature was 120° C.; and the oil supply pressure was 3 $kg/cm^2$.

The crystal structure of the Pb alloy in the slide surface after the wear test is similar to those shown in FIGS. 22 and 23. In the primary layer 20 in the example of the present invention, many voids 16 were observed.

TABLE 6

|  | Example of the Invention | | Comparative Example |
|---|---|---|---|
|  | Primary Layer | Secondary Layer |  |
| Crystal form | columnar | granular | granular |
| Oe in (h00) plane (%) | 100 | 23 | 28 |
| Hardness (Hmv) | 21 | 14 | 17 |
| Percent area of openings of voids (%) | 3.5–4 | — | — |
| Surface pressure when seizure is generated at initial stage of sliding movement ($kg/cm^2$) | — | 220 | 200 |
| Amount of wear after lapse of initial stage of sliding movement (μm) | 4 | — | 6.8 |

As apparent from Table 6, the initial conformability in the example of the present invention is good due to the low hardness of the secondary layer 21, thereby ensuring that the surface pressure at the time of generation of seizure at the initial stage of sliding movement can be increased, as compared with the comparative example. On the other hand, after lapse of the initial stage of the sliding movement, i.e., after wearing of the secondary layer 21, the primary layer 20 exhibits an excellent lubricating power, because a large number of voids 16 are opened its the slide surface 11a and serve as oil (or lubricant) reservoir means, as in the slide bearing of FIG. 22. In addition, the hardness of the primary layer 20 is increased due to the orientation index Oe of 100% in the (h00) plane, so that any wear of the primary layer 20 can be substantially suppressed. However, if the percent area $A_1$ occupied by the openings of the voids 16 is less than 0.2% ($A_1 < 0.2\%$), the lubricating power of the primary layer 20 is low. On the other hand, if $A_1 > 10\%$ the primary layer 20 has a reduced strength.

The apexes $a_1$ of the quadrangular pyramid-shaped crystals 15 in the primary layer 20 are preferentially worn at the initial stage of the sliding movement and hence, the conformability of the primary layer 20 is good.

The first oriented crystals $14_1$ in the primary layer 20 may have a shape similar to that shown in FIGS. 25 and 26. A slide bearing with first oriented crystals $14_1$ forming a portion of the primary layer 20 is also included in the present invention. In this case, the percent area $A_3$ of end faces of the first oriented crystals $14_1$ in a cross section parallel to the slide surface is set in a range of $A_3 \geq 50\%$. The inclination angle $\Theta$ of the first oriented crystals $14_1$ is set in a range of $0° \leq \Theta \leq 30°$, as in the previously described embodiment. Moreover, a slide bearing with a primary layer 20 having no void 16 is also included in the present invention.

Although the surface layer has been formed by the electro-plating process in the above-described embodiments, it will be understood that any other processes may be used for forming a surface layer, which include those using a gas phase, such as PVD, ion-plating, CVD, sputtering, etc. The technology disclosed in the second to fifth embodiments is not limited to the slide bearing, but also applicable to other slide members.

What is claimed is:

1. A slide member, comprising:
   a base member; and
   a surface layer made of an alloy formed on the base member, wherein said surface layer includes a plurality of columnar crystals extending in proximity to one another from a side of said base member, the columnar crystals belonging to a cubic system and having (h00) planes by Miller indices that are directed so as to define a slide surface for a mating member, the percent area A of said (h00) planes in said slide surface being set in a range of $A \geq 50\%$.

2. A slide member according to claim 1, wherein a dense aggregate of granular crystals is precipitated on said base member and said columnar crystals are made of the same material as said dense aggregate of granular crystals and precipitated on said dense aggregate of granular crystals, said columnar crystals having at least one crystal form selected from the group of: quadrangular pyramid-shaped crystals; and truncated quadrangular pyramid-shaped crystals to form said slide surface.

3. A slide member according to claim 1, wherein said columnar crystals are precipitated on said base member, and an aggregate of granular crystals is precipitated on said columnar crystals that has a hardness lower than that of said columnar crystals.

4. A slide member according to claim 1, wherein an inclination angle $\Theta$ of said columnar crystals with respect to a line perpendicular to a plane extending parallel to said slide surface is set in a range of $0° \leq \Theta \leq 30°$.

5. A slide member, comprising:
   a base member; and
   a surface layer made of an alloy formed on the base member, wherein said surface layer includes a plurality of columnar crystals extending in proximity to one another from a side of said base member and voids that are formed between adjacent columnar crystals and open to a slide surface to serve as lubricant reservoir means, said columnar crystals belong to a cubic system and have (h00) planes by Miller indices directed so as to define said slide surface for a mating member, and the percent area A of said (h00) planes in said slide surface is set in a range of $A \geq 50\%$.

6. A slide member according to claim 5, wherein a dense aggregate of granular crystals is precipitated on said base member and said columnar crystals are made of the same material as said dense aggregate of granular crystals and precipitated on said dense aggregate of granular crystals, said columnar crystals having at least one crystal form selected from the group of: quadrangular pyramid-shaped crystals; and truncated quadrangular pyramid-shaped crystals to form said slide surface.

7. A slide member according to claim 5, wherein said columnar crystals are precipitated on said base member, and an aggregate of granular crystals is precipitated on said columnar crystals that has a hardness lower than that of said columnar crystals.

8. A slide member according to claim 5, wherein said inclination angle $\Theta$ of said columnar crystals with respect to a line perpendicular to a plane extending parallel to said slide surface is set in a range of $0° \leq \Theta \leq 30°$.

9. A slide member, comprising:
   a base member; and
   a surface layer made of an alloy formed on said base member, said surface layer having a slide surface for a mating member, and wherein said surface layer is comprised of a dense aggregate of granular crystals precipitated on said base member and a plurality of columnar crystals precipitated on said dense aggregate of granular crystals, said columnar crystals having at least one crystal form selected from the group of: quadrangular pyramid-shaped crystals; and truncated quadrangular pyramid-shaped crystals to form said slide surface.

10. A slide member, comprising:
    a base member; and
    a surface layer made of an alloy formed on said base member, wherein said surface layer has a slide surface for a mating member, and said surface layer is comprised of a plurality of columnar crystals precipitated on said base member so as to extend in proximity to one another from a side of said base member and an aggregate of granular crystals precipitated on said columnar crystals, the granular crystals having a hardness lower than that of said columnar crystals.

11. A slide member, comprising:
    a base member; and
    a surface layer made of an alloy formed on said base member, said surface layer having a slide surface for a mating member, and wherein said surface layer is comprised of:
    (i) a plurality of columnar crystals precipitated on said base member so as to extend in proximity to one another form a side of said base member and voids that are formed between adjacent columnar crystals and open to said slide surface to serve as lubricant reservoir means; and
    (ii) an aggregate of granular crystals precipitated on said columnar crystals that has a hardness lower than that of the columnar crystals.

* * * * *